US009522683B2

(12) United States Patent
Senn et al.

(10) Patent No.: US 9,522,683 B2
(45) Date of Patent: Dec. 20, 2016

(54) METHOD FOR INFLUENCING GRAVITATIONAL DISCHARGE OF MATERIAL FROM A RAILROAD HOPPER CAR

(71) Applicants: MINER ENTERPRISES, INC., Geneva, IL (US); POWERBRACE CORPORATION, Kenosha, WI (US)

(72) Inventors: Brian A. Senn, South Milwaukee, WI (US); Richard M. Charney, South Milwaukee, WI (US); Nicholas B. Earnest, Kenosha, WI (US)

(73) Assignees: Miner Enterprises, Inc., Geneva, IL (US); Powerbrace Corporation, Kenosha, WI (US)

( * ) Notice: Subject to any disclaimer, the term of this patent is extended or adjusted under 35 U.S.C. 154(b) by 0 days.

(21) Appl. No.: 15/145,579

(22) Filed: May 3, 2016

(65) Prior Publication Data
US 2016/0244075 A1 Aug. 25, 2016

Related U.S. Application Data

(62) Division of application No. 14/258,461, filed on Apr. 22, 2014, now Pat. No. 9,393,970.

(51) Int. Cl.
| | |
|---|---|
| *B61D 7/00* | (2006.01) |
| *B61D 7/02* | (2006.01) |
| *B61D 7/26* | (2006.01) |
| *B61D 7/20* | (2006.01) |
| *B65G 67/24* | (2006.01) |

(52) U.S. Cl.
CPC . *B61D 7/02* (2013.01); *B61D 7/20* (2013.01); *B61D 7/26* (2013.01); *B65G 67/24* (2013.01)

(58) Field of Classification Search
CPC ............... B61D 7/00; B61D 7/02; B61D 7/06; B61D 7/08; B61D 7/12; B61D 7/14; B61D 7/16; B61D 7/20; B61D 7/24; B61D 7/26; B61D 7/32
See application file for complete search history.

(56) References Cited

U.S. PATENT DOCUMENTS

| | | | | |
|---|---|---|---|---|
| 2,644,408 | A | * | 7/1953 | Dorey ...................... B61D 7/16 105/282.2 |
| 3,837,294 | A | * | 9/1974 | Fossett ..................... B61D 7/20 105/253 |
| 3,933,100 | A | * | 1/1976 | Dugge ..................... B61D 7/20 105/282.3 |
| 4,301,741 | A | * | 11/1981 | Chierici ............... B65D 90/587 105/282.3 |

(Continued)

*Primary Examiner* — Jason C Smith
(74) *Attorney, Agent, or Firm* — Law Office of John W. Harbst

(57) ABSTRACT

A method for influencing gravitational discharge of material from a railcar gate assembly is arranged in material receiving relation relative to a hopper on the railcar. The gate assembly defines a discharge opening and includes a slide gate for controlling the discharge of material from the hopper car. A first portion of the gate assembly is operably disposed above the slide gate and a second portion of the gate assembly is disposed below the slide gate. An adapter is releasably suspended below the discharge opening for influencing the discharge of material from the second portion of the gate assembly.

12 Claims, 24 Drawing Sheets

(56) References Cited

U.S. PATENT DOCUMENTS

| | | | | |
|---|---|---|---|---|
| 5,448,955 A | * | 9/1995 | Dugge | B65D 90/587 105/282.3 |
| 5,507,235 A | * | 4/1996 | Dugge | B61D 7/26 105/282.3 |
| RE35,925 E | * | 10/1998 | Dohr | B61D 7/26 105/282.3 |
| 6,123,030 A | * | 9/2000 | Dohr | B61D 7/20 105/282.2 |
| 6,263,803 B1 | * | 7/2001 | Dohr | B61D 7/26 105/282.1 |
| 6,899,038 B2 | * | 5/2005 | Fortuna | B61D 7/20 105/282.2 |
| 2013/0068127 A1 | * | 3/2013 | Charney | B61D 7/26 105/282.2 |
| 2013/0068128 A1 | * | 3/2013 | Senn | B61D 7/26 105/282.2 |

\* cited by examiner

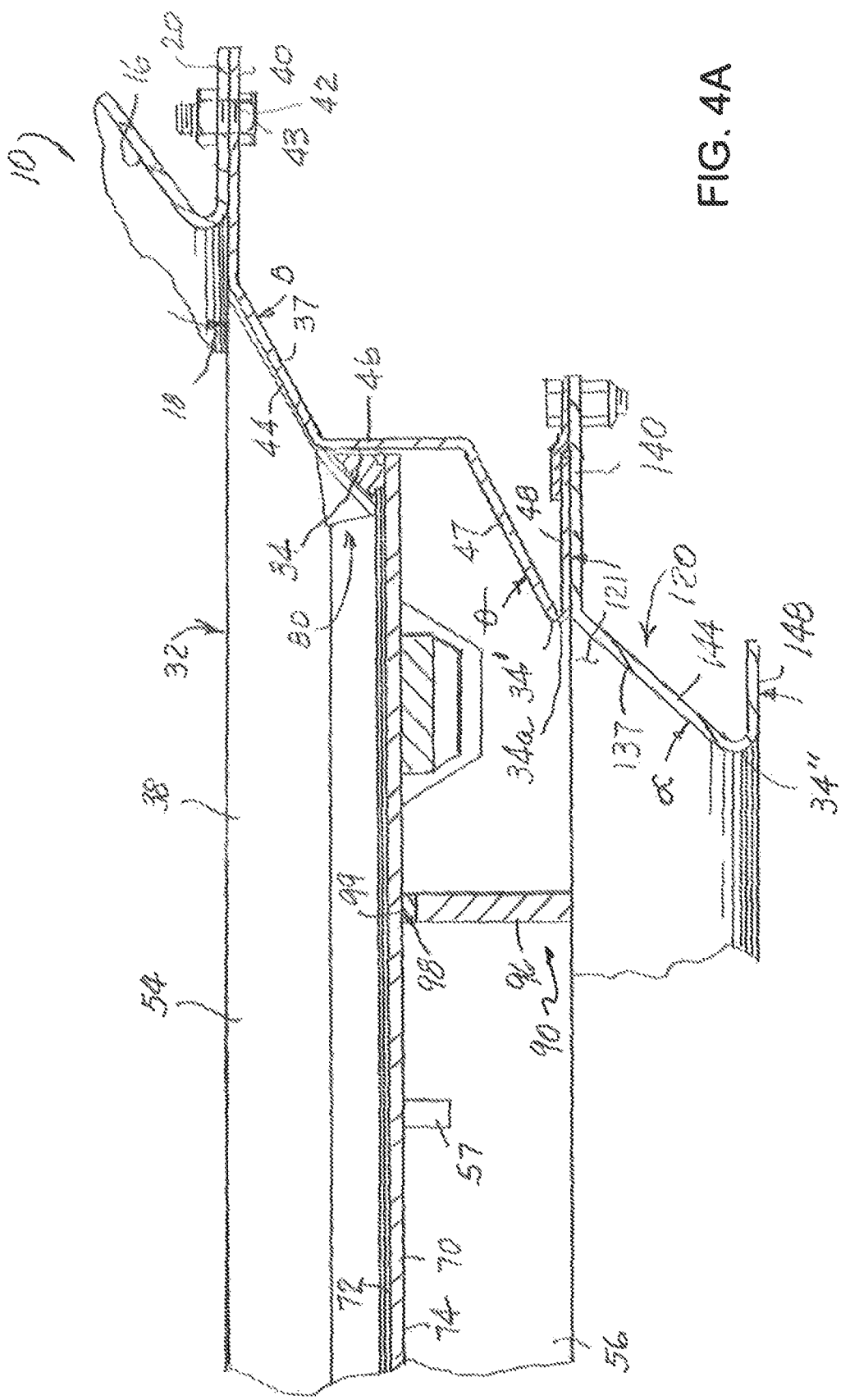

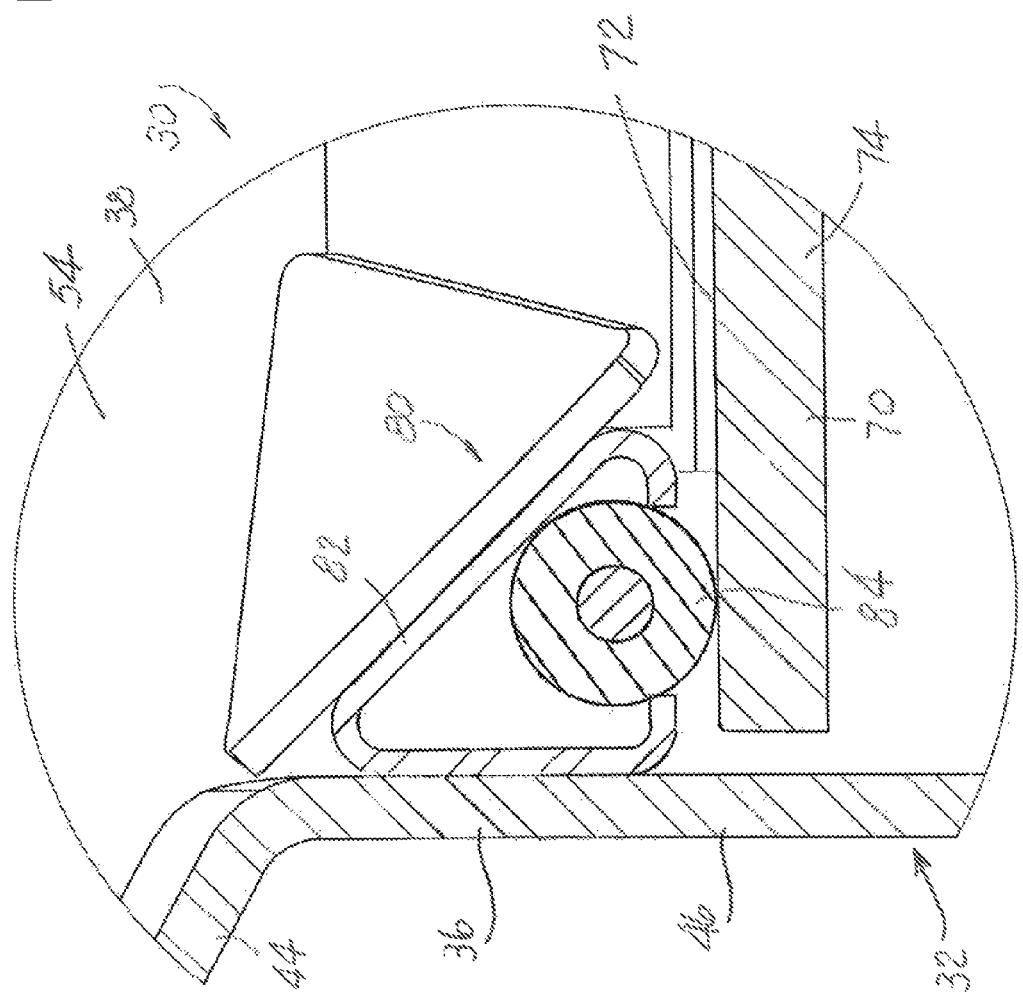

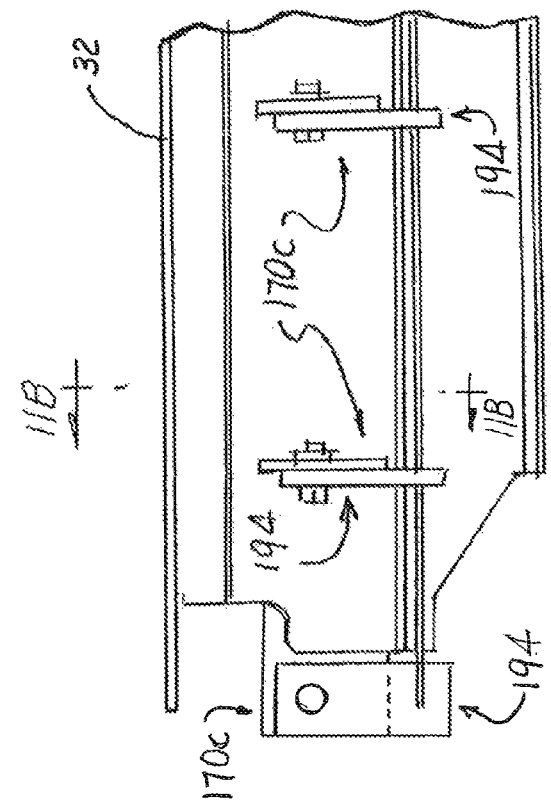
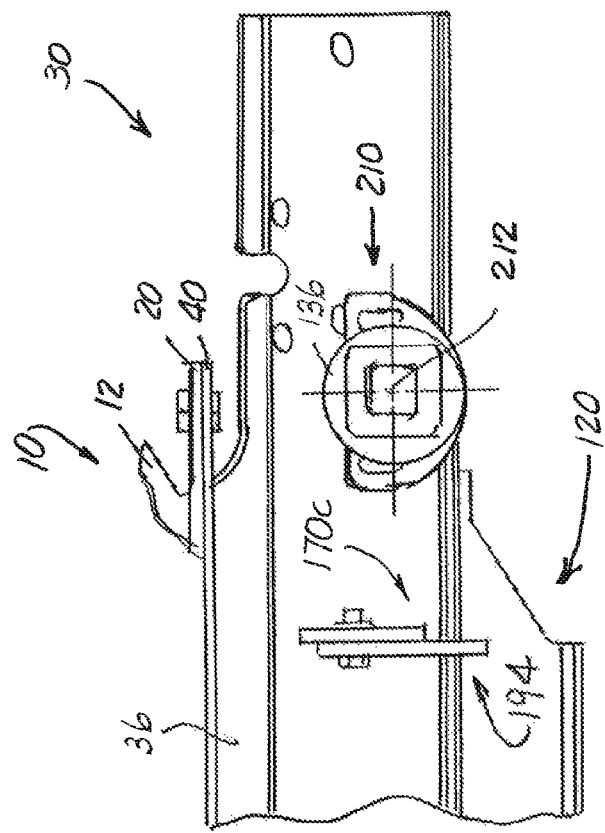
FIG. 11A

METHOD FOR INFLUENCING GRAVITATIONAL DISCHARGE OF MATERIAL FROM A RAILROAD HOPPER CAR

RELATED APPLICATION

This application is a divisional patent application to U.S. patent application Ser. No. 14/258,461 filed on Apr. 22, 2014; the entirety of which is incorporated herein by reference.

FIELD OF THE INVENTION DISCLOSURE

The present invention disclosure generally relates to railroad hopper cars and, more particularly, to a method for influencing gravitational discharge of material from a railroad hopper car.

BACKGROUND

Railroad hopper cars are commonly used to economically transport commodities between distantly spaced geographic locations. Such hopper cars include a hopper typically having a plurality of longitudinally spaced chutes. At the bottom of the car, each chute terminates in a chute opening. Hopper cars typically include a mounting flange provided about each standard opening on the bottom of the hopper car. Such hopper car mounting flanges typically define a series of apertures or openings arranged in a generally standard bolting pattern.

Dry granular commodities can be rapidly discharged from the hopper car through gate assemblies mounted in material receiving relation relative to the chute openings on the bottom of the hopper car. A frame of each gate assembly defines a discharge opening having a generally rectangular shape and through which such commodities are gravitationally discharged from the hopper car. A gate or door is slidably movable on the frame and a drive mechanism is provided for moving the gate between closed and open positions. In a closed position, the gate prevents discharge of the commodity from the hopper car. When the gate is opened, the commodity is gravitationally discharged through the discharge opening defined by the gate assembly. As will be appreciated by those skilled in the art, the commodity carried by the railroad hopper car places a significant columnar load on an upper surface of the gate and on the frame of the gate assembly. Any openings, recesses or grooves in any of the interconnected frame members of the gate assembly can significantly weaken or adversely affect both the strength and rigidity required of the frame of the gate assembly.

In effect, the gate assembly frame includes an upper portion disposed above an upper surface of the gate and a lower portion disposed below a lower surface of the gate. The upper portion of the gate assembly frame includes, toward an upper end thereof, a mounting flange designed to facilitate securement of the gate assembly to the hopper car. The upper portion of the gate assembly defines a first or upper discharge opening which approximates the size of the chute opening on the railcar. The lower portion of the gate assembly frame defines a second or lower discharge opening. Moreover, the lower portion of a typically gate assembly includes outwardly extending flange structure arranged in surrounding relation with the second or lower discharge opening.

Once a hopper car reaches an unloading site, the gate on the gate assembly is opened and gravity causes the commodity within the walled enclosure or hopper on the car to freely drop from the railcar's hopper through the discharge opening and into a take-away device. There are several common options for the take-away device. One option involves an open-pit having conveyance equipment, i.e., a belt-conveyor or pneumatic conveyor arranged toward a bottom thereof.

A second option involves a sealed pit using unloading "boots." With this device, a boot is raised from beneath and between the rails and seals against the outwardly extending flange structure or "boot flange" on the bottom of the gate assembly. During discharge, the commodity falls from the hopper, passing into the boot, from whence the commodity is directed toward and deposited onto conveyance equipment under the rails. These unloading boots are available in several standard sizes. Typically, there is "standard" spacing between such unloading boots. Problematically, however, the spacings between the opening of the outlet gates is not always the same as the spacing between such unloading boots. Accordingly, the discharge openings on the gate assembly may not always vertically align with the discharge boot rising from beneath and between the rails and vice-versa. As such, commodity being discharge from the hopper car sometimes spills outside of the misaligned unloading boot and is lost. Such economical loss is simply unacceptable.

Another common option for directing a discharged commodity from the hopper car involves use of a portable unloading sled having a selectively operable conveyor. Unlike unloading pits, which are more or less permanently located, portable unloading sleds allow unloading of the railcar at almost any location where the railcar can be safely parked and accessed. These portable unloading sleds are specifically designed to fit between the top or upper surface of the rails and the bottom of the discharge gate assembly. To reduce the commodity lost during discharge and transfer of the commodity, the portable sleds abut with or against the "boot flange" on the bottom of the gate assembly.

Prior to the discharge of commodity from the railcar, the portable unloading sled is wheeled or otherwise moved into place on top of the rails and under the discharge outlet of the gate assembly. The conveyor is engaged or otherwise "turned ON" and the gate of the gate assembly is thereafter opened. The unloading sled serves to convey the commodity received from the hopper of the railcar into silos, truck-trailers, or is simply deposited onto the ground.

It is desirable for railroad hopper cars used in services which unload into a portable unloading sled to, at some time during their service life, have the capability of being moved or returned to service wherein the gate assembly is required to unload into an unloading boot. The rectangular boot flange opening, however, on one very common and/or popular gate assembly measures about 26.5 inches by about 56 inches. The rectangular boot flange opening on another very common and/or popular gate assembly measures about 25.25 inches by about 59 inches. As such, and when the most common and popular gate assemblies unload into a standard unloading boot, having an outside dimension of about 19 inches by about 48 inches, commodity being discharged from the hopper car often times spills outside of the unloading boot and is lost. Again, such an economical loss is simply unacceptable.

The Association of American Railroads (the "AAR") has revised the Standard governing locking systems for gate assemblies used on hopper-type railroad cars. The revised Standard (S-233-2011) requires the locking/unlocking or latching/unlatching functions for the gate assembly to be integrated into the discharge gate operating mechanism. As such, rotation of a capstan in a direction to open the gate must first unlock or unlatch the gate and then move the gate from the closed position to the open position.

Thus, there is a continuing need and desire for a railcar discharge gate assembly which is readily adaptable to either unloading over an open pit or into an unloading boot while minimizing loss of commodity whereby significantly adding to the versatility of usage of the railcar while also satisfying the latest AAR Standard.

SUMMARY

In accordance with one aspect, there is provided a discharge gate assembly for a railroad hopper car. The gate assembly includes a rigid frame including a pair of opposed side frame members rigidly joined to a pair of opposed end frame members in a generally rectangular design and defining a first or upper discharge opening of a predetermined size and through which commodity is adapted to gravitationally pass. A gate or door is supported on the frame for linear movement in a single generally horizontal path of travel between a closed position, wherein the gate prevents a flow of commodity through the discharge opening, and an open position. Each side frame member and each end frame member includes an upper outwardly extending mounting flange. Also, each end frame member and side frame member includes a lower outwardly extending boot flange arranged below a lower surface of the gate.

According to this aspect, the gate assembly further includes an adapter disposed below the boot flange on the frame members. The adapter defines a second or lower discharge opening for the gate assembly. Notably, the adapter includes a horizontally slanted surface extending inwardly from a marginal edge of the discharge opening of the gate assembly. Moreover, the adapter includes a lower boot flange for allowing a discharge boot to be abutted thereagainst during discharge of material from the hopper car. The adapter boor flange coupled with the size of the second discharge opening defined by the adapter allows a discharge boot to be abutted against the adapter to effect discharge of commodity from the hopper car while minimizing commodity loss. As such, and rather than forcing a customer/car builder to purchase a gate assembly designed for a particular discharge operation, the adapter of this invention disclosure permits customization of the gate assembly as to both size and location of the discharge opening whereby significantly adding to versatility of the gate assembly. The adapter is releasably suspended by structure in material receiving relation below the discharge opening defined by the frame members of the gate assembly frame.

In one form, the adapter of the gate assembly is slidably coupled to and supported by the lower outwardly extending flanges on at least two opposed frame members. Fasteners are preferably used to releasably affix the structure to the gate assembly frame. In an alternative form, the structure for releasably suspending the adapter below the frame assembly includes a clamping mechanism. In yet another form, weldments are used to affix the structure for restricting commodity flow passing from the discharge opening to the gate assembly frame. In still another embodiment, the structure for releasably suspending the adapter below the frame assembly includes bracketry carried by the gate assembly frame and adapter.

The gate assembly further includes an operating shaft assembly supported by extensions of the side frame members for rotation about a fixed axis; with the operating shaft assembly being operably coupled to the gate. The operating shaft assembly can be operably coupled to the gate through pinions mounted on a rotatable shaft In this form, the pinions are arranged in intermeshing relation with racks carried on the gate. Preferably, seal structure is arranged in sealing engagement with the upper surface of and toward a periphery of the gate. A lock assembly is also preferably provided for preventing inadvertent movement of the gate toward the open position. In one form, the lock assembly is operable in timed relation relative to rotation of the operating shaft assembly such that a stop is positively removed from the path of travel of the gate prior to movement of the gate toward an open position. In one form, the stop positively engages with the gate thereby preventing inadvertent movement of the gate toward an open position. Preferably, the gate assembly further includes a lost motion mechanism which collapses upon rotation of the operating shaft assembly in a direction to move the gate toward an open position whereafter the operating shaft assembly is operably coupled to the gate In a preferred embodiment, the gate assembly further includes a plurality of supports extending in generally parallel relation relative to each other and between the opposed end frame members for supporting the gate Each support preferably extends in the direction in which the gate moves between the closed and open positions. One end of each support is secured to the end frame member disposed the furthest distance from the operating shaft assembly. In this embodiment, each support is secured to and extends through the opposed end frame member. Each support is preferably structured to guide and support the shaft of the operating shaft assembly thereby limiting deflection of the shaft relative to the fixed axis when the shaft is rotated to move the gate toward the open position.

According to another aspect of the invention, there is provided a discharge gate assembly for a railroad hopper car. In this embodiment, the gate assembly includes a rigid frame having an upper portion defined above a gate slidably supported on said frame and a lower portion defined below said gate. The frame includes a pair of laterally spaced and generally parallel side frame members and a pair of longitudinally spaced and generally parallel end frame members fixed between the side frame members to define a discharge opening through which commodity is adapted to gravitationally pass. The frame members each have a boot flange. Preferably, the boor flanges on the frame members. are arranged below the gate and in generally coplanar relation relative to each other The gate assembly further includes an adapter including a series of horizontally slanted surfaces extending inwardly from a marginal edge of the discharge opening so as to influence the commodity flowing or passing from the gate assembly. The adapter includes a series of lower boot flanges arranged in generally coplanar relation relative to each other so as to allow a discharge boot to be abutted thereagainst. Structure is provided for releasably suspending the adapter blow the lower portion of the gate in material receiving relation relative to the discharge opening defined by the frame members.

According to this aspect, the surfaces on the adapter are horizontally slanted downwardly at an acute angle relative to a horizontal plane. In one form, the adapter is slidably coupled to and supported by the lower outwardly extending flange on at least two of the frame members Fasteners serve to releasably affix the adapter to the gate assembly frame. Alternatively, the adapter can be slidably coupled to and supported by the outwardly extending flange on at least two outwardly extending frame members; with such structure including fasteners for releasably affixing the structure to the gate assembly frame. In yet another embodiment, the structure for releasably suspending the adapter below the lower portion of the gate assembly includes a clamping mechanism serves to releasably affix the adapter to at least two of the frame members of the gate assembly frame. In still another embodiment, the structure for releasably suspending the adapter below the lower portion of the gate assembly includes bracketry carried by said gate assembly frame and the adapter.

The gate assembly further includes an operating shaft assembly supported by extensions on the side frame members for rotation about a fixed axis. The operating shaft is operably coupled to the gate. In one embodiment, the operating shaft assembly is operably coupled to the gate through pinions mounted on a shaft rotatable about the fixed axis. In this form, the pinions are arranged in intermeshing relation with racks carried on the lower surface of the gate. Preferably, the operating shaft assembly includes an elongated operating shaft supported by extensions of the side frame members for rotation about a fixed axis. Seal structure is preferably arranged in sealing engagement with the upper surface of and toward a periphery of the gate.

A lock assembly is preferably provided for inhibiting inadvertent movement of the gate toward the open position. The lock assembly is preferably operable in timed relation relative to rotation of the operating shaft assembly. In one form, the lock assembly includes a stop which, when the gate is in the closed position, positively engages with the gate thereby preventing inadvertent movement of the gate toward an open position and which is operably removed from the path of travel of the gate prior to said gate being positively moved toward the open position under the influence of the operating shaft assembly.

A mechanical system is preferably provided between the lock assembly stop and the operating shaft assembly for positively displacing the stop from engagement with the gate upon rotation of the operating shaft assembly and prior to movement of the gate toward the open position. In one embodiment, the mechanical system includes a lost motion mechanism which collapses upon rotation of the operating shaft assembly in a direction to move the gate toward the open position whereafter the operating shaft assembly is operably coupled to the gate.

In another family of embodiments, there is provided a discharge gate assembly adapted to be secured in material receiving relation relative to a chute opening defined toward a bottom of a railroad hopper car. The gate assembly includes a rigid frame having a pair of laterally spaced, opposed and generally parallel side frame members and a pair of longitudinally spaced, opposed and generally parallel end frame members. The frame members define a first discharge opening for the gate assembly. A gate is supported on the frame for linear sliding movement along a single predetermined and generally horizontal path of travel between closed and open positions. The gate includes upper and lower generally parallel surfaces.

In this embodiment, the side frame members and end frame members each include an upper outwardly extending flange, with the upper flanges on the frame members being arranged above the upper surface of the gate and in generally coplanar relation relative to each other. The upper flanges on the frame members define a bolting pattern generally corresponding to a standard bolting pattern surrounding the chute opening toward the bottom of the railroad hopper car whereby facilitating securement of the gate assembly to the hopper car. Moreover, the frame members each include a depending wall extending generally perpendicular to the upper flange and below the lower surface of the gate. Each frame member further has a horizontally slanted wall extending between and joining the upper flange and the respective depending wall thereof. Each horizontally slanted wall extends downwardly and away from the upper flange on the respective frame member and inwardly toward the discharge opening. Each frame member further includes a boot flange extending generally parallel to the upper flange. The boot flanges on the side and end frame members are arranged below the lower surface of the gate and in generally coplanar relation relative to each other.

In this embodiment, the gate assembly further includes an adapter defining a second discharge opening disposed below the first discharge opening of the gate assembly. The second discharge opening defined by the adapter is sized to influence commodity flowing or passing from the first discharge opening of the gate assembly. In one form, the adapter includes a series of horizontally slanted surfaces extending inwardly from a marginal edge of the first discharge opening defined by the gate assembly. Structure is also provided for releasably suspending the adapter below and in material receiving relation relative to the first discharge opening defined by the frame members of the rigid frame In one form, the adapter is slidably coupled to and suspended by boot flanges on at least two of the frame members. Fasteners releasably affix the structure to the gate assembly frame. Such fastener can include one or more weldments. Alternatively, a clamping mechanism can be used for releasably affixing the adapter to the gate assembly frame. In yet another embodiment, the structure for releasably suspending the adapter below the frame assembly includes bracketry carried by said gate assembly fame and the adapter.

An operating shaft assembly is supported by extensions of the side frame members for selectively moving the gate between closed and open positions. Moreover, a lock assembly is preferably provided on the gate assembly for inhibiting inadvertent movement of the gate toward the open position. The lock assembly is preferably operable in timed relation relative to rotation of the operating shaft assembly. Preferably, the lock assembly includes a stop which, when the gate is in the closed position, positively engages with the gate thereby preventing inadvertent movement of the gate toward an open position and which is operably removed from the path of travel of the gate prior to the gate being positively moved toward the open position under the influence of the operating shaft assembly.

A mechanical system is preferably provided between the lock assembly stop and the operating shaft assembly for positively displacing the stop from engagement with the gate upon rotation of the operating shaft assembly and prior to movement of the gate toward the open position. The mechanical system includes a lost motion mechanism which collapses upon rotation of the operating shaft assembly in a direction to move the gate toward the open position whereafter the operating shaft assembly is operably coupled to the gate.

According to another aspect of this invention disclosure, there is provided a method for influencing the discharge of material from a railroad hopper car. Such method involves the step of: providing a discharge gate assembly in material receiving relation relative to a discharge outlet defined by the hopper car. The discharge gate assembly includes a rigid frame which supports a gate for sliding movement between open and closed positions. The gate assembly is operably divisible into an upper portion arranged above the gate and a lower portion arranged below the gate. Frame members of the discharge gate assembly define a first or upper discharge opening through which commodity is adapted to gravitationally pass from the hopper car. The lower portion of the gate assembly defines a boot flange arranged below the lower surface of the gate.

Another step in the method for influencing the discharge of material from a railroad hopper car involves: releasably suspending an adapter beneath the discharge opening defined by the discharge gate assembly for influencing material being discharged through the discharge opening defined by the frame members of the gate assembly. In one form, the adapter is releasably secured to a generally horizontal boot flange on the lower or second portion of the gate assembly. Releasably suspending the adapter below the gate assembly allows this hopper car to be returned to service wherein the gate assembly is required to unload material from the hopper car and into or onto an unloading sled.

The step of releasably suspending the adapter to the gate assembly frame can be accomplished in several ways. In one manner, the step of releasably suspending the adapter relative to the gate assembly can be accomplished by first sliding the structure onto the lower flanges of at least two opposed frame members and then releasably securing the structure to the gate assembly frame. Alternatively, releasably suspending the adapter below the gate assembly frame is contemplated as involving clamping the adapter to the gate assembly frame. In yet another form, releasably securing the adapter to the gate assembly frame is contemplated as involving welding the adapter to the gate assembly frame. In still another form, releasably suspending the adapter below the gate assembly so as to influence commodity passing the gate assembly can be effected through bracketry disposed between the adapter and the gate assembly frame.

In one form, the adapter includes at least two horizontally slanted surfaces. Each horizontally slanted surface is arranged in depending relation relative to mounting flanges arranged at an upper surface of the adapter and extends inwardly at an acute angle from at least two marginal edges defining the discharge opening on the gate assembly frame.

DESCRIPTION OF THE DRAWINGS

FIG. 4A is an enlarged sectional view taken along line 4A-4A of FIG. 2;

FIG. 7 is an enlarged view of that area encircled in FIG. 4;

FIG. 11A is a side view of the gate assembly showing alternative structure for releasably suspending an adapter below the gate assembly so as to influence commodity being discharged from the gate assembly;

DETAILED DESCRIPTION OF THE PRESENT INVENTION

Figure 1:
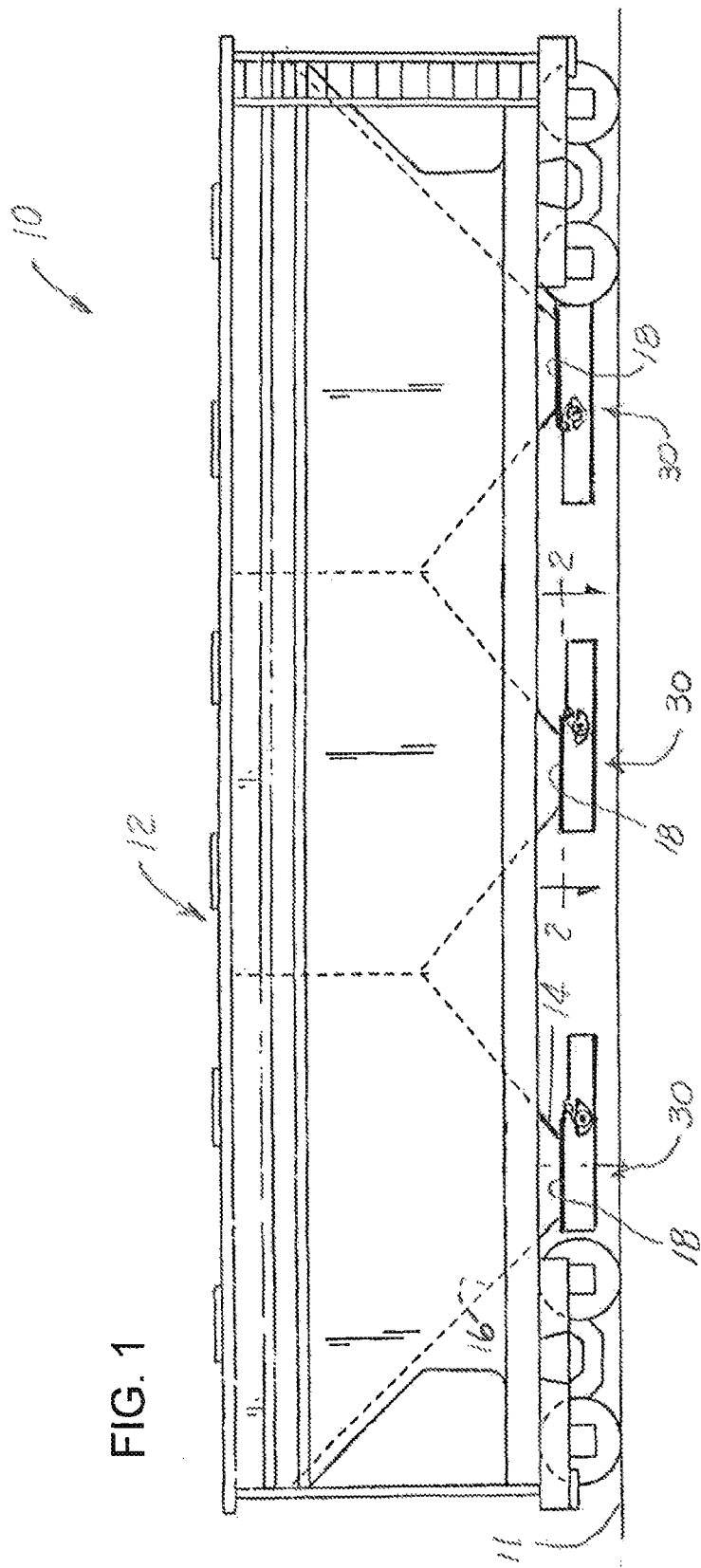
FIG. 1 is side elevational view of a railroad hopper car having mounted thereon a series of gate assemblies which embody one form of the present invention disclosure.

While the present invention is susceptible of embodiment in multiple forms, there is shown in the drawings and will hereinafter be described preferred embodiments of the invention disclosure, with the understanding the present disclosure sets forth exemplifications of the invention which is not intended to limit the invention disclosure to the specific embodiment illustrated and described.

Referring now to the drawings, wherein like reference numerals indicate like parts throughout the several views, schematically shown in FIG. 1 is a railroad hopper car, generally indicated by numeral 10, which is movable between locations over conventional rails 11. Although railroad hopper-type cars have a variety of configurations, they generally have a walled enclosure or hopper 12 for storing and transporting commodity therewithin. A bottom 14 of car 10 can also take a variety of configurations. Suffice it to say, in the exemplary embodiment, the bottom 14 of the enclosed hopper 12 is provided with a plurality of longitudinally spaced funnel shaped chutes 16 between opposed ends of the hopper 12.

Figure 4:
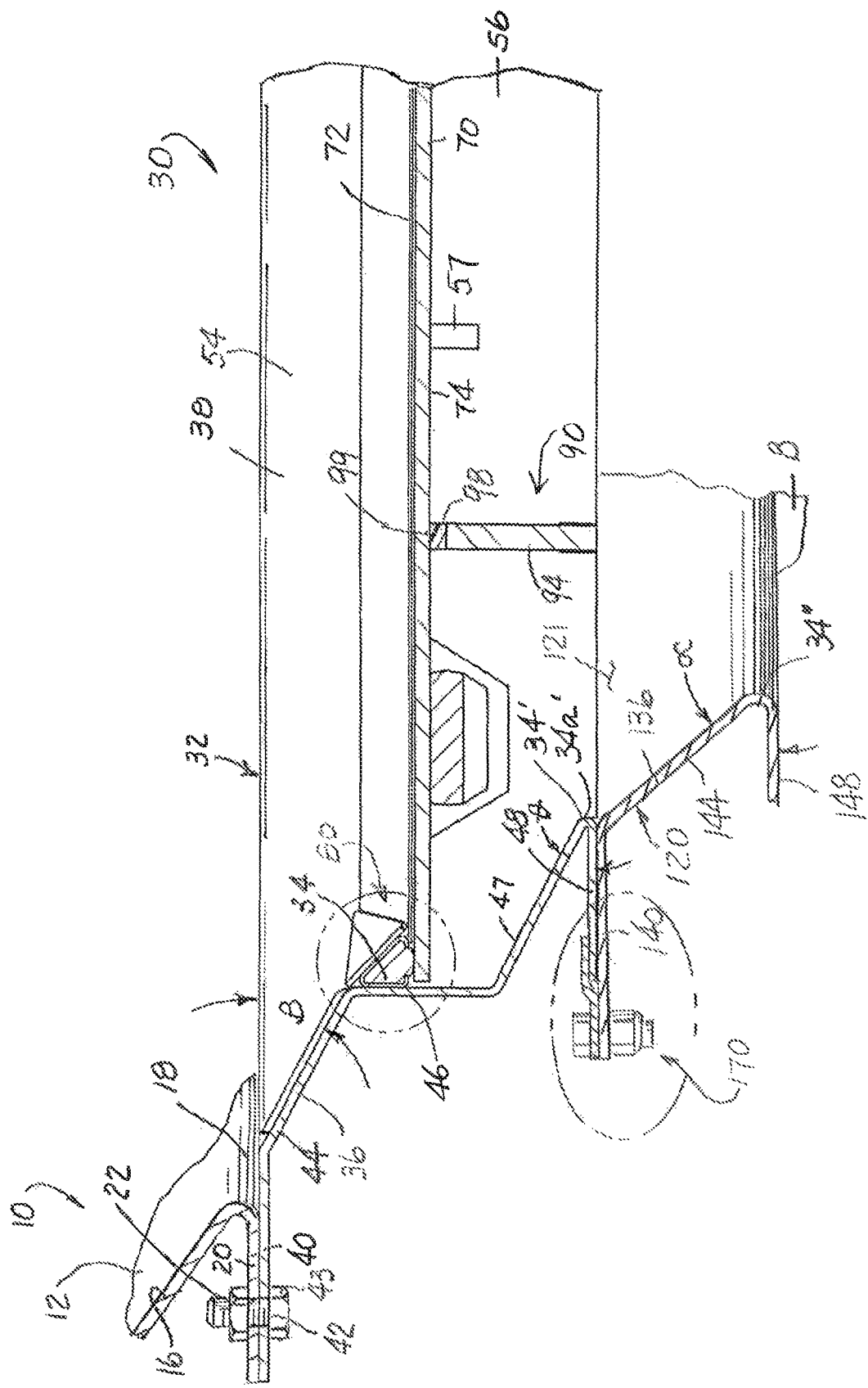
FIG. 4 is an enlarged sectional view taken along line 4-4 of FIG. 2.
Figure 5:
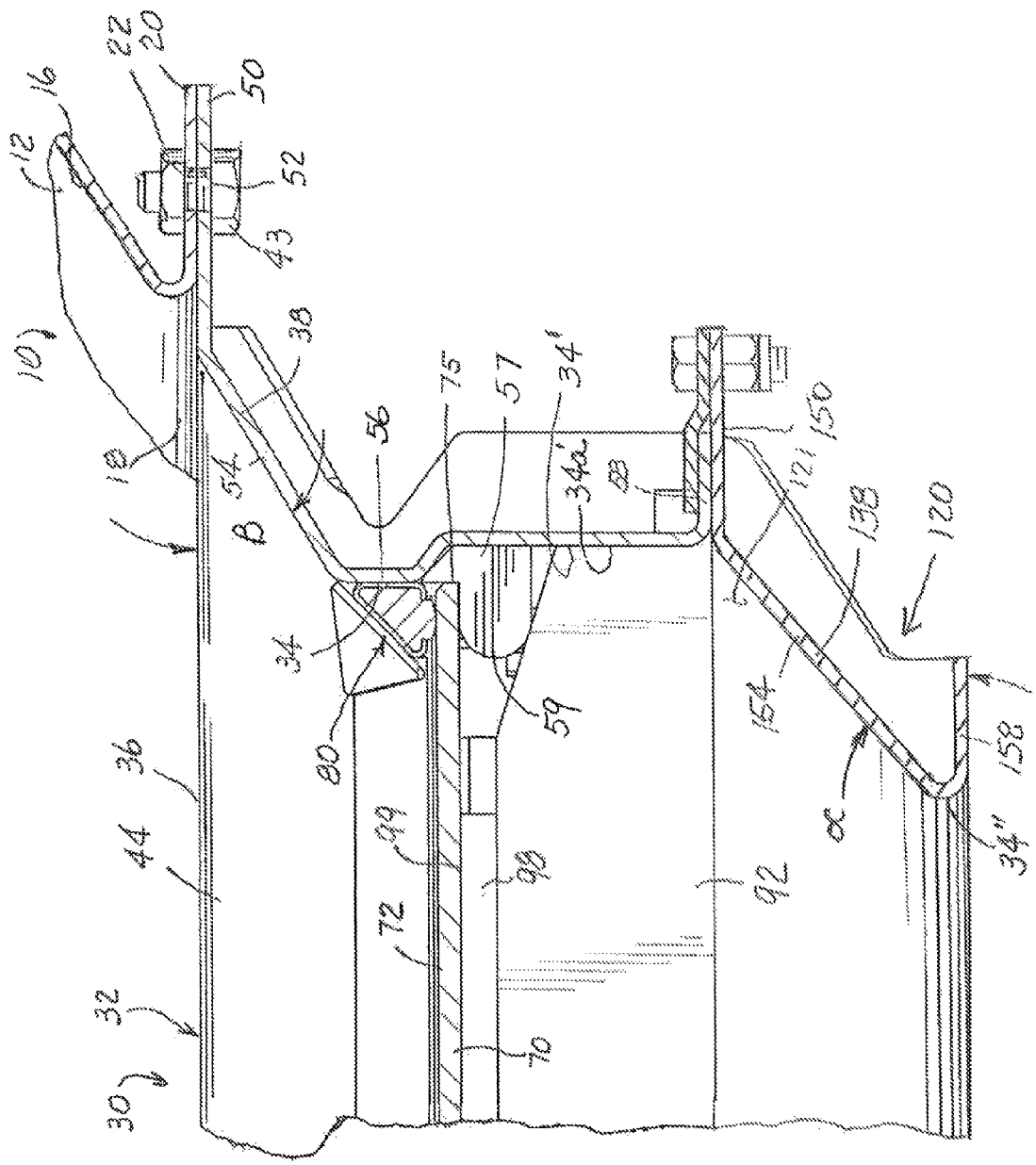
FIG. 5 is an enlarged sectional view taken along line 5-5 of FIG. 2.

As shown in FIG. 1, each hopper chute 16 has a chute opening 18 through which commodity is gravitationally discharged from car 10. Moreover, and as shown in FIGS. 4 and 5, hopper 12 is provided with a mounting flange 20 extending outwardly from and arranged about each chute opening 18 on hopper 12. Typically, flange 20 defines a series of side-by-side openings or holes 22 (FIG. 4) which combine to define a standard bolting pattern on the mounting flange 20 on hopper 12. In the illustrated embodiment, the side-by-side openings or holes 22 (FIG. 4) combine to define a conventional 13 by 42 bolting pattern.

According to the present invention disclosure, a discharge gate assembly 30 is arranged in material receiving relation relative to each lower chute opening 18 on the hopper 12 to control the discharge of commodity from the railcar 10. Broadly stated, each railcar gate assembly of the present invention disclosure includes a slide gate movable between a closed position and an open position to control the discharge of material from the hopper car. From an operational perspective, a first or upper portion of the gate assembly is operably disposed above the slide gate and a second or lower portion of the gate assembly is disposed below the slide gate. As described in detail below, a boot adapter is releasably connected to and controls the discharge of material from the lower portion of the gate assembly. Each gate assembly 30 on the railcar is substantially similar, thus, only one gate assembly will be described in detail.

Figure 2:
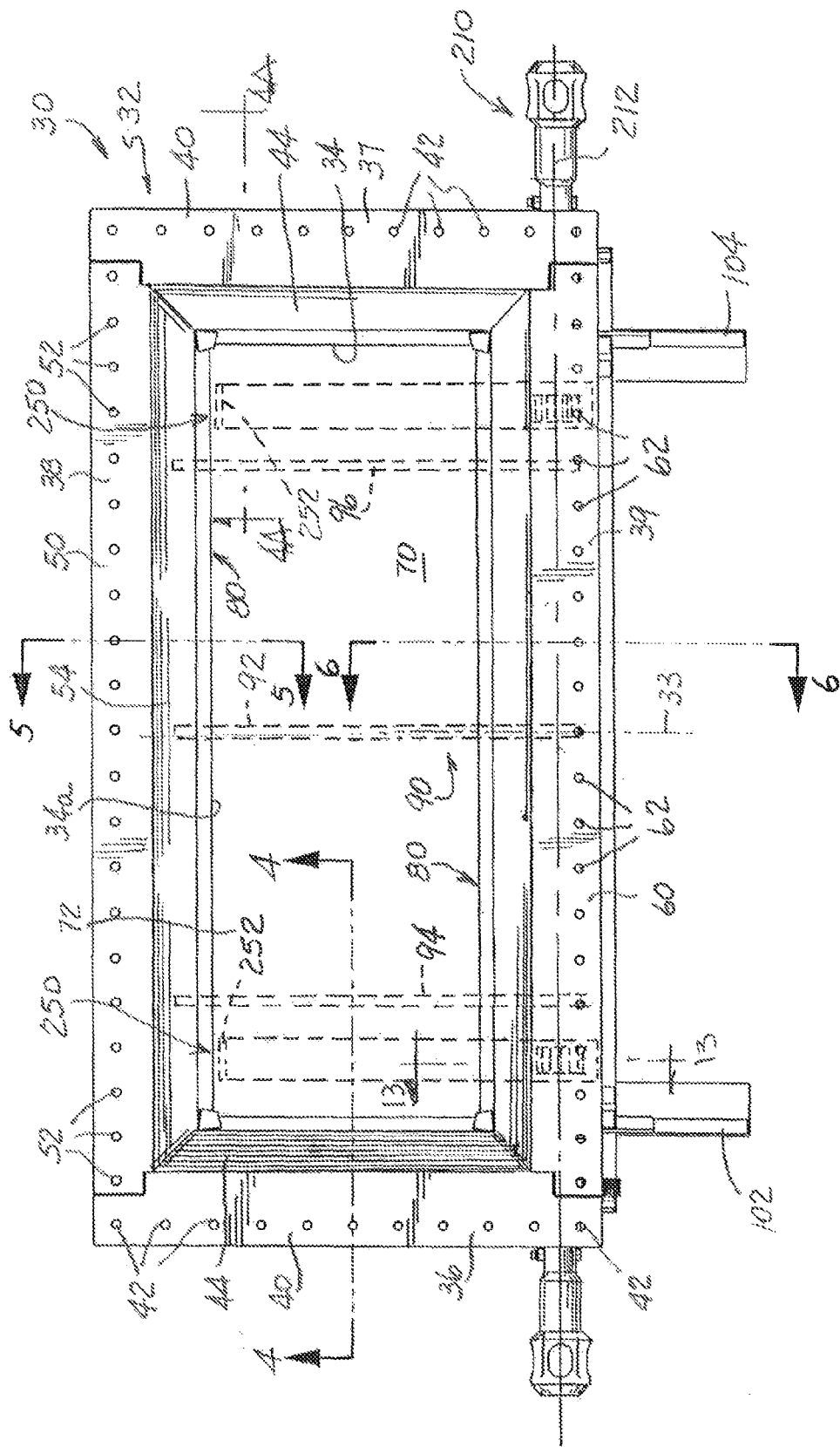
FIG. 2 is an enlarged sectional view taken along line 2-2 of FIG. 1.
Figure 3:
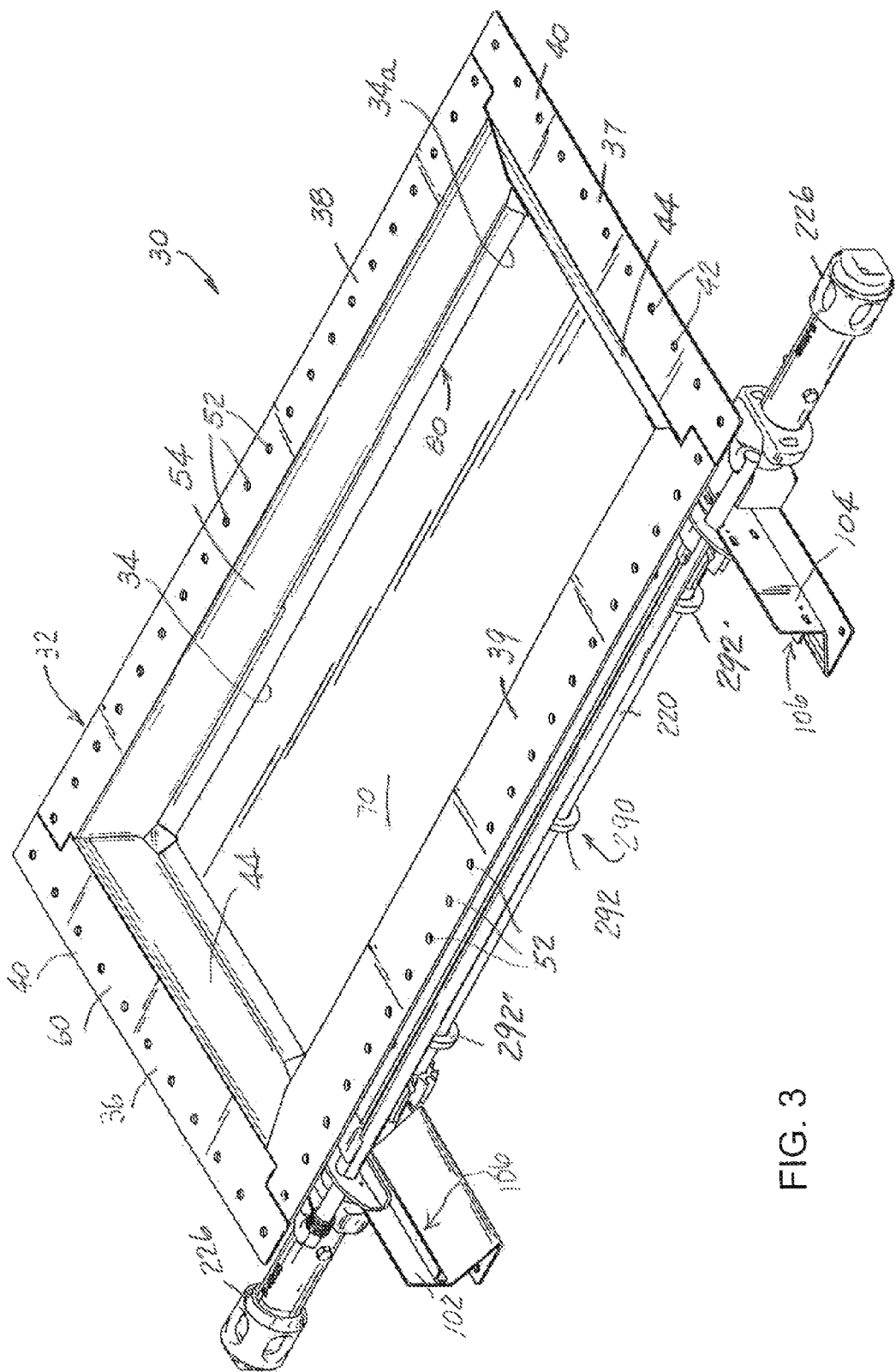
FIG. 3 is perspective view of the gate assembly illustrated in FIG. 2.

In the embodiment shown in FIGS. 2 and 3, each gate assembly 30 includes a rigid frame 32 having an axis 33 and defining a first discharge opening 34 having a generally rectangular marginal edge 34a. In one embodiment, the area of the first discharge opening 34 defined by the frame 32 of gate assembly 30 measures approximately 955 square inches. Gate assembly 30 also includes a gate 70 which, as discussed below, is selectively movable between a closed position, wherein commodity is prevented from passing through the first discharge opening 34, and an open position. Gate 70 moves in a single generally horizontal path of travel so as to selectively control the gravitational discharge of commodity from the hopper 12 (FIG. 1). Gate assembly frame 32 is formed of a pair of generally parallel and opposed metal side frame members 36, 37 along with first and second generally parallel and opposed metal end frame members 38, 39 rigidly fixed to each other and which combine to provide a generally rectangular configuration, in plan, to the discharge opening 34. In one form, the side frame members 36, 37 are configured as mirror images of each other. Accordingly, only side frame member 36 will be discussed in detail.

As shown in FIGS. 2, 4 and 4A, the side frame members 36, 37 of gate assembly 30 each include an upper outwardly extending and rigid and generally planar mounting flange 40 arranged above an upper surface 72 of the gate 70 and defining a series of side-by-side openings or holes 42 so as to allow a shank portion of a threaded fastener 43 to extend therethrough. In the illustrated embodiment, fastener 43 includes and cooperates with a threaded nut whereby securing the gate assembly 30 to the conventional mounting flanges 20 on the bottom of the railcar hopper 12. In the embodiment illustrated by way of example, the side frame members 36, 37 of gate assembly 30 each further include a horizontally slanted generally planar wall 44 extending or angling downwardly and away from the respective upper mounting flange 40 on each side frame member and inwardly toward a center of the discharge opening 34 of the gate assembly 30.

In the illustrated embodiment, the slanted wall 44 of each side frame member 36, 37 extends inwardly toward the discharge opening 34 and at acute angle β relative to a horizontal plane defined by the upper mounting flange 40 on each side member of the discharge gate assembly 30. In one form, the slanted wall 44 of each side frame member 36, 37 extends at angle preferably ranging between about 26 degrees and about 40 degrees relative to a horizontal plane defined by the upper mounting flange 40 on each side member 36, 37 of the discharge gate assembly 30.

In the embodiment shown in FIGS. 4 and 4A, each side frame member 36, 37 also includes a depending wall 46 extending generally perpendicular to the upper flange 40 and rigidly joined toward and to a distal end of the horizontally slanted wall 44 of each side frame member. In the illustrated embodiment, the depending wall 46 of each side frame member 36, 37 extends from where it is joined to the horizontally slanted wall structure 44 above the upper surface 72 of gate 70 downwardly past a lower surface 74 of gate 70. Preferably, the depending wall 46 on each side member of the gate assembly 30 is formed integral with the mounting flange 40 and horizontally slanted wall 44 of each side frame member.

In the embodiment shown by way of example in FIGS. 4 and 4A, each side frame member 36, 37 further includes a horizontally slanted wall 47 extending inwardly from the respective depending wall 46 and preferably from the edge of the discharge opening 34 and at acute angle θ relative to a horizontal plane defined by the upper mounting flange 40 on each side member of the discharge gate assembly 30. In one form, the slanted wall 47 of each side frame member 36, 37 extends downwardly and inwardly at acute angle preferably ranging between about 26 degrees and about 40 degrees relative to a horizontal plane defined by the upper mounting flange 40 on each side member of the discharge gate assembly 30.

In the embodiment illustrated by way of example in FIGS. 4 and 4A, the horizontally slanted wall 47 on each side frame member 36, 37 terminates at a location where it is joined to a boot flange 48. As shown, the boot flange 48 of each side frame member 36, 37 is spaced from but extends in the same direction and in generally parallel relation with the respective mounting flange 40. Preferably, the mounting flange 40, the horizontally slanted wall 44, the depending wall 46, the horizontally slanted wall 47, and boot flange 48 of each side frame member 36, 37 are all integrally formed with each other. It is, however, with simple design modifications, to fabricate the horizontally slanted wall 47 and boot flange as a separate assembly which can be bolted or otherwise secured to the side frame member without seriously detracting or departing from the spirit and scope of this invention disclosure.

In one form, the forward or first end frame member 38, at that end of gate assembly 30 which engages a transverse edge 75 of gate 70 when gate 70 is in a closed position, is designed differently from either side frame members 36, 37 or the rear second end frame member 39 (FIGS. 2 and 3). In the embodiment shown in FIGS. 2 and. 5, the forward or first end frame member 38 includes an upper outwardly extending, rigid and generally planar mounting flange 50 arranged above the upper surface 72 of gate 70 and defining a series of side-by-side openings or holes 52 to allow a shank portion of a threaded fastener 43 to extend therethrough. In the illustrated embodiment, fastener 43 includes and cooperates with a threaded nut whereby facilitating securement of gate assembly 30 to the conventional mounting flange 20 on the bottom of the railcar hopper 12 (FIG. 5). Notably, the upper mounting flange 50 of the end frame member 38 is arranged generally coplanar with the mounting flange 40 on each side frame member 36, 37.

In the embodiment illustrated in FIG. 5, the first end frame member 38 preferably includes a horizontally slanted generally planar wall 54 extending downwardly and away from the respective upper mounting flange 50 of end frame member 38 and inwardly toward a center of the discharge opening 34 for the gate assembly 30.

The slanted wall 54 on the first or forward end frame member 38 extends inwardly at angle β relative to a horizontal plane defined by the upper mounting flange 50 on the end frame member 38. In one form, the slanted wall 54 on the end frame member 38 extends inwardly toward the discharge opening 34 and at acute angle ranging between about 26 degrees and about 40 degrees relative to a horizontal plane defined by the upper mounting flange 50 on the end frame member 38. Preferably, the slanted wall 54 on the end frame member 38 extends inwardly toward the discharge opening 34 and at acute angle β which is generally equal to the acute angle β defined between the slanted wall 44 of each side frame member 36, 37 of gate assembly 30.

In the embodiment shown in FIG. 5, the end frame member 38 further includes a depending wall 56 extending generally perpendicular to the upper flange 50 and rigidly joined toward and to a distal end of the horizontally slanted wall 54 of the end frame member 38. The depending wall 56 of end frame member 38 extends from where it is joined to the horizontally slanted wall structure 54 above the upper surface 72 of gate 70 downwardly past the lower surface 74 of gate 70. Preferably, the depending wall 56 on end frame member 38 is formed integral with the mounting flange 50 and the horizontally slanted wall 54.

Also, in the embodiment shown in FIG. 5, the first end frame member 38 further includes a boot flange 58 disposed toward the lower end of and extending outwardly and away from the depending wall 56. The boot flange 58 of the end frame member 38 is spaced from but extends in the same direction and in generally parallel relation with the respective mounting flange 50. Preferably, the mounting flange 50, the slanted wall 54, the depending wall 56, and the boot flange 58 are integrally formed with each other. Moreover, the boot flange 58 of the end frame member 38 is preferably arranged in generally coplanar relation relative to the boot flange 48 on the side frame members 36 and 37 of gate assembly 30.

As shown in FIG. 5, the end frame member 38 of gate assembly 30 is furthermore preferably provided with a series of laterally spaced supports 57 (with only one being shown in FIG. 5 for exemplary purposes) secured thereto. The supports 57 are arranged across the depending wall 56 of the end frame member 38 and serve to engage with and support the gate end 75 as gate 70 approaches a closed position relative to the discharge opening 34. Preferably, each support 57 is provided with a camming surface 59 for facilitating vertical positioning of the end 75 of gate 70 in the closed position relative to the discharge opening 34 of gate assembly 30.

Figure 6:
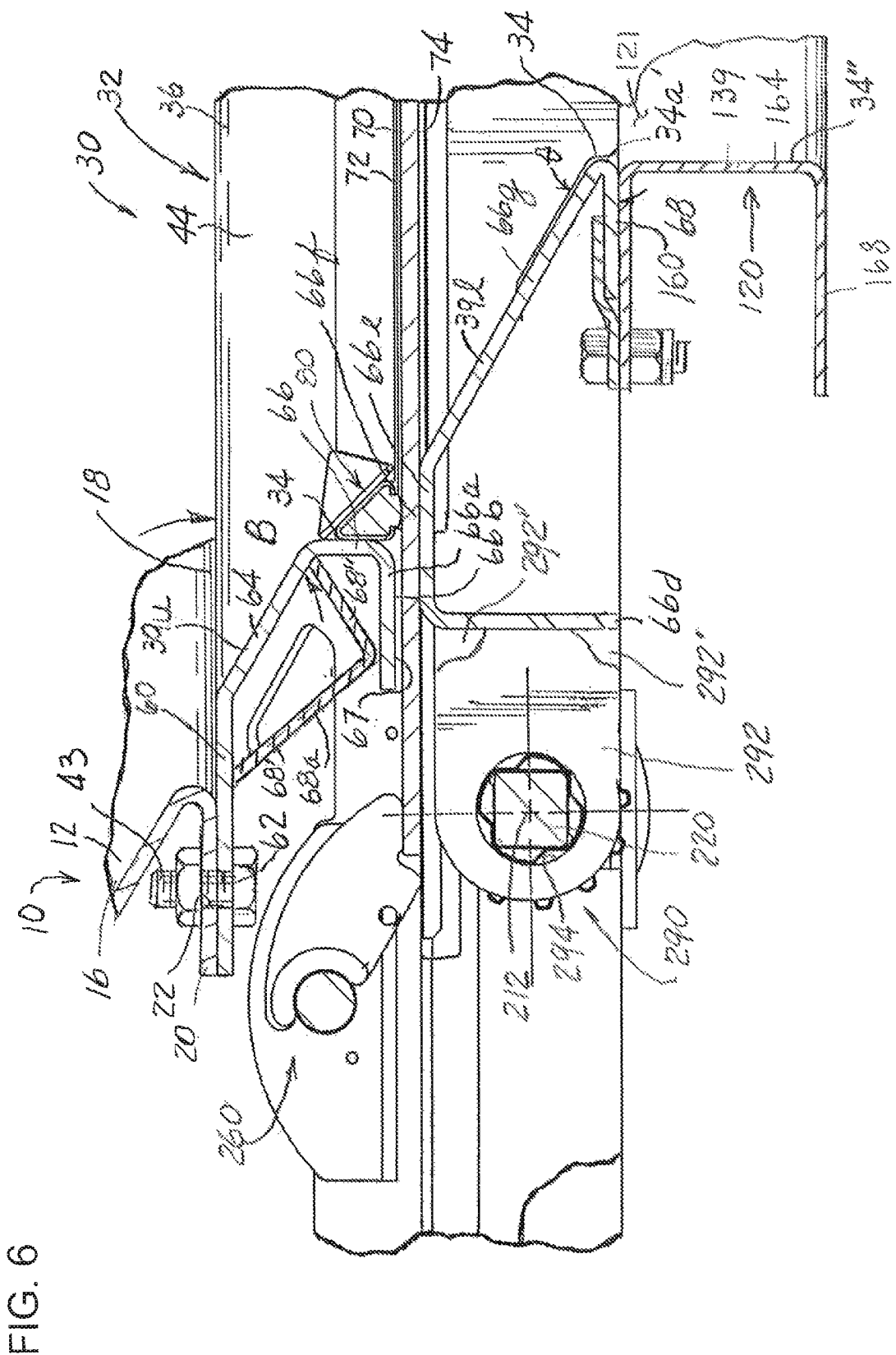
FIG. 6 is a fragmentary enlarged sectional view taken along line 6-6 of FIG. 2.
Figure 6A:
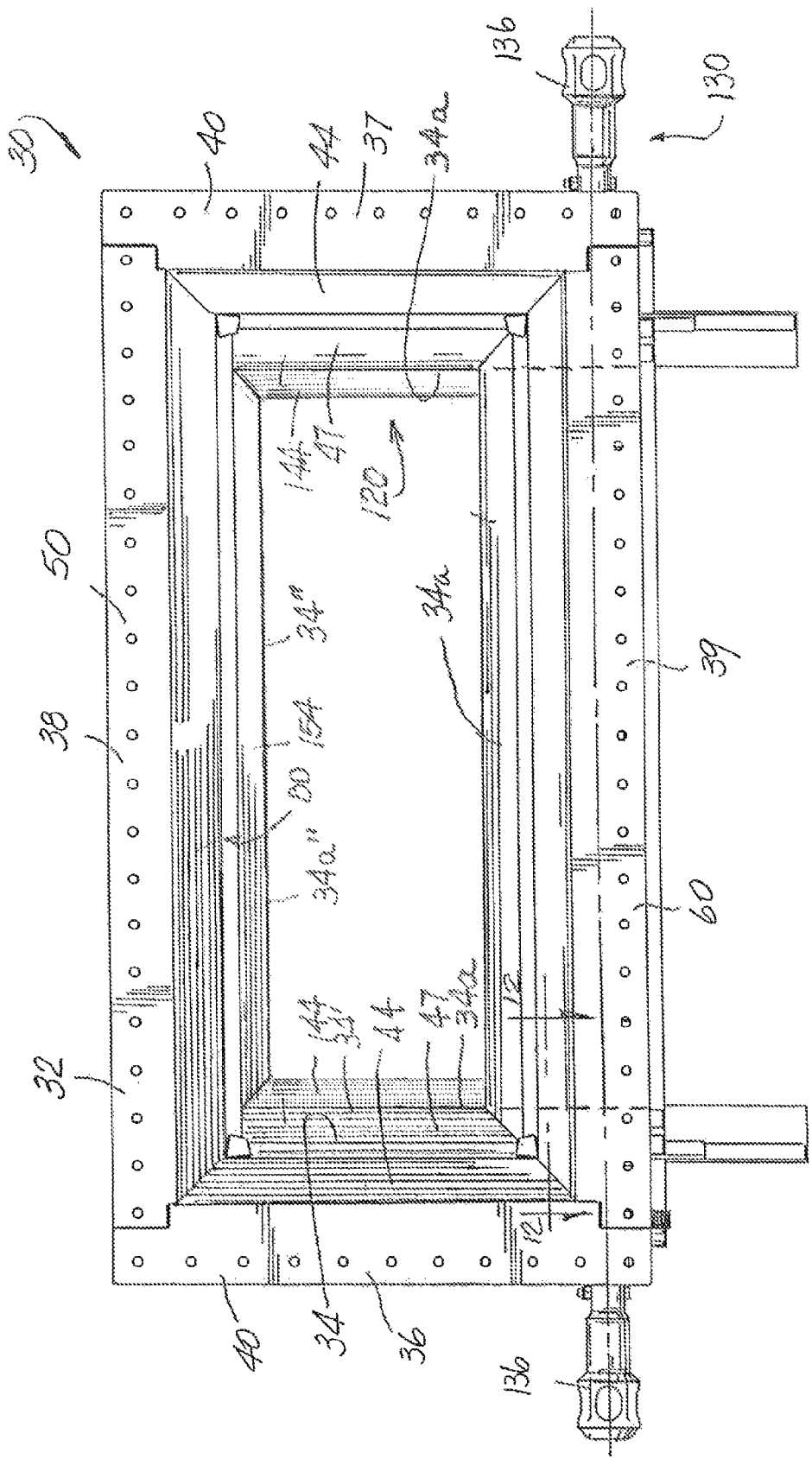
FIG. 6A is a view similar to FIG. 2 but having the gate removed from the frame assembly.

The second or rear end frame member 39 of gate assembly 30 includes an upper portion 39u and a lower portion 39l which, in the embodiment illustrated by way of example in FIG. 6, are rigidly connected to the side frame members 36 and 37 (FIG. 2) of gate assembly 30 but are separate from each other. As shown in FIG. 6, the upper portion 39u of the end frame member 39 includes an outwardly extending, rigid and generally planar mounting flange 60 arranged above an upper surface 72 of the gate 70 and defining a series of side-by-side openings or holes 62 to allow a shank portion of a threaded fastener 43 to extend therethrough. In the illustrated embodiment, fastener 43 includes and cooperates with a threaded nut whereby facilitating securement of gate assembly 30 to the conventional mounting flange 20 on the bottom of the railcar hopper 12. Notably, the mounting flange 60 of the upper portion 39u on the second end frame member 39 is arranged generally coplanar with the mounting flanges 40 on each side frame member 36, 37 (FIG. 2) and the mounting flange 50 on end member 38 (FIG. 5).

As further illustrated by way of example in FIG. 6, the upper portion 39u of the second end frame member 39 further includes a horizontally slanted generally planar wall 64 extending downwardly and away from the respective upper mounting flange 60 and inwardly toward a center of the discharge opening 34 of gate assembly 30. The horizontally slanted wall 64 on the upper portion 39u of the second end frame member 39 extends inwardly at acute angle β relative to a horizontal plane defined by the upper mounting flange 60 on the end frame member 39. In one form, the slanted wall 64 on the upper portion 39u of the second end frame member 39 extends inwardly toward the discharge opening 34 at an acute angle approximating 30 degrees relative to a horizontal plane defined by the upper mounting flange 60 on the end frame member 39. Preferably, the slanted wall 64 on the upper portion 39u of the end frame member 39 extends inwardly at acute angle β which is generally equal to the acute angle β defined between the slanted walls 44 and 54 of the side frame members 36, 37 and end frame member 38, respectively, of gate assembly 30.

In the embodiment shown in FIG. 6, the upper portion 39u of the end frame member 39 also has a depending wall 66 extending generally perpendicular to the upper flange 60 and rigidly joined toward and to a distal end of the horizontally slanted wall 64 above the upper surface 72 of gate 70. In this embodiment, and as shown in FIG. 6, wall 66 of the upper portion 39u of the end frame member 39 depends from where it is joined to the horizontally slanted wall structure 44 above the upper surface 72 of gate 70 and terminates in a generally horizontal wall section 66a having a surface 66b disposed above an upper surface 72 of gate 70. Preferably, the depending wall 66 on the end frame member 39 is formed integral with the mounting flange 60 and the horizontally slanted wall 64 of upper portion 39u of the end member 39.

Preferably, the upper portion 39u of the end frame member 39 furthermore includes a stiffening member 68a for adding strength and rigidity thereto. In one form, the stiffening member 68a transversely extends between the side frame members 36 and 37 (FIG. 2) of the gate frame 32 above the gate 70 and below the upper mounting flange 60 of the end frame member 39. In the illustrated embodiment, the stiffening member 68a includes two legs 68' and 68" which are angled relative to each other. An end of leg 68' of member 68a is fastened as by welding and the like to an underside of the upper mounting flange 60. An end of leg 68" is fastened as by welding and the like to an underside of the horizontally slanted wall 64, preferably in the general area where the horizontally slanted wall 64 is rigidly joined and angles relative to the depending wall 66 on the upper portion 39u of the end frame member 39.

In the illustrated embodiment, the lower portion 39l of the second end wall 39 of gate assembly 30 includes a generally vertical wall 66d disposed below the lower surface 74 of gate 70. Wall 66d is fixed between the side frame members 36 and 37 (FIG. 5) to inhibit transverse bending and to enhance support for a generally horizontal wall 66e defining a generally horizontal surface 66f supporting the lower surface 74 of gate 70. and which spans the distance between the opposed side frame members 36 and 37 of frame 32. As shown, surface 66f is vertically spaced from surface 66a of the upper portion 39u of the end wall 39 so as to define an opening or slot 67 therebetween. The opening or slot 67 extends transversely across the width of the end member 39 whereby permitting gate 70 to slidably move therethrough in a single generally horizontal path of travel between closed and open positions. Preferably, the generally vertical wall 66d and the generally horizontal wall 66e of the lower portion 39l of frame 32 are rigidly joined to each other. In the embodiment illustrated by way of example in FIG. 6, the generally vertical wall 66d of the lower portion 39l of the second end wall 39 and the depending wall 66 on the upper portion 39u of the second end wall 39 are disposed in generally the same vertical plane relative to each other.

In the embodiment illustrated by way of example in FIG. 6, the lower portion 39l of the second end wall 39 of gate assembly 30 also includes a horizontally slanted wall 66g extending downwardly and inwardly toward a center of the discharge opening 34 from a terminal end of the generally horizontal wall 66e and at acute angle θ relative to a horizontal plane defined by the upper mounting flange 60 on the end frame member of the discharge gate assembly 30. In one form, the slanted wall 66g on the lower portion 39l of the second end wall 39 extends downwardly and inwardly at acute angle preferably ranging between about 26 degrees and about 40 degrees relative to a horizontal plane defined by the upper mounting flange 60 on the upper mounting portion 39u of the end frame member 39 discharge gate assembly 30.

In the embodiment illustrated in FIG. 6, the horizontally slanted wall 66g on the lower portion 39l of the end frame member 39 terminates at a location where it is joined to a boot flange 68. As shown, the boot flange 68 on the lower portion 39l of the end frame member 39 is spaced from but extends in the same direction and in generally parallel relation with the mounting flange 60. Preferably, the wall 66d, wall 66e, slanting wall 66g and the boot flange 68 are integrally formed with each other. Preferably, the boot flanges 48 on the side frame members 36 and 37 (FIG. 4), along with the boot flange 58 on the end frame member 38 (FIG. 5) together with the boot flange 68 on the lower portion 39l of the end frame member 39 are all arranged in parallel and generally coplanar relation relative to each other.

In the embodiment illustrated by way of example in FIGS. 4 and 4A, the terminal edges of the slanted walls 47 on each side frame member 36, 37 along with the terminal edge of the slanted wall 66g on the lower portion 39l of the end frame member 39 (FIG. 6) in combination with wall 56 of end member 38 (FIG. 5) combine to define a second discharge opening 34' having a generally rectangular marginal edge 34a' for gate assembly 30. This second discharge opening 34' is disposed beneath or below the lower surface of the gate 70 and defines a generally smaller area than does the discharge opening 34 whereby serving to restrict or otherwise baffle the flow of commodity passing from the discharge opening 34. In one embodiment, the area of the second discharge opening 34' is about 24% smaller than the area of the first discharge opening 34. In one example, the area of the second discharge opening 34' measures approximately 725 square inches.

Returning to FIGS. 2 and 3, seal structure 80 is preferably carried by the gate assembly frame 32 for inhibiting debris and insect infiltration between the frame 32 and gate 70. In the illustrated embodiment, seal structure 80 is arranged relative to a periphery of the gate 70 when gate 70 is in the closed position. In one form, seal structure 80 preferably includes a hollow mounting 82 secured to the respective depending walls of the side frame members and end frame members (with only the side frame member 36 being shown in FIG. 7) of the gate assembly frame 32 above the upper surface 72 of gate 70. The hollow mounting 82 is specifically configured to allow commodity discharged from the hopper 12 of railcar 10 to readily pass thereover. In one form, structure 80 includes a conventional carpet seal 84, or other suitable seal, accommodated preferably within the mounting 82, and configured to sealingly engage the upper surface 72 of and after gate 70 is moved to a closed position.

Gate assembly frame 32 furthermore preferably includes structure 90 for facilitating the discharge of material through the gate assembly 30 while also serving to support the gate 70 in the closed position, In the embodiment shown in FIG. 2, structure 90 includes a generally centralized support 92 with two additional supports 94 and 96 disposed to opposite sides of the central support 92. Supports 92, 94, and 96 are disposed beneath the closed gate 70, extend generally parallel to the direction of travel of the gate 70 between closed and open positions, and are attached, in laterally spaced relation, to the end frame members 38, 39 of frame 32. Of course, structure 90 can include more supports if so desired without detracting from this invention disclosure.

In the illustrated embodiment, a suitable material 98 (FIGS. 4 and 5) is provided between the lower surface 74 of the gate 70 and each support of structure 90 for enhancing sliding movement of the gate 70 from the closed position toward the open position. Preferably, and as shown in FIGS. 4 and 5, an upper surface 99 of each support 90, 92 and 94 (with only support 94 and 92 being shown in FIGS. 4 and 5, respectively) is preferably defined by the material 98 between the lower surface 74 of the gate 70 and each support of structure 90. Preferably, material 98 includes ultra-high molecular weight polyethylene or similar material for reducing the coefficient of friction between the gate 70 and the support structure 90.

Figure 8:
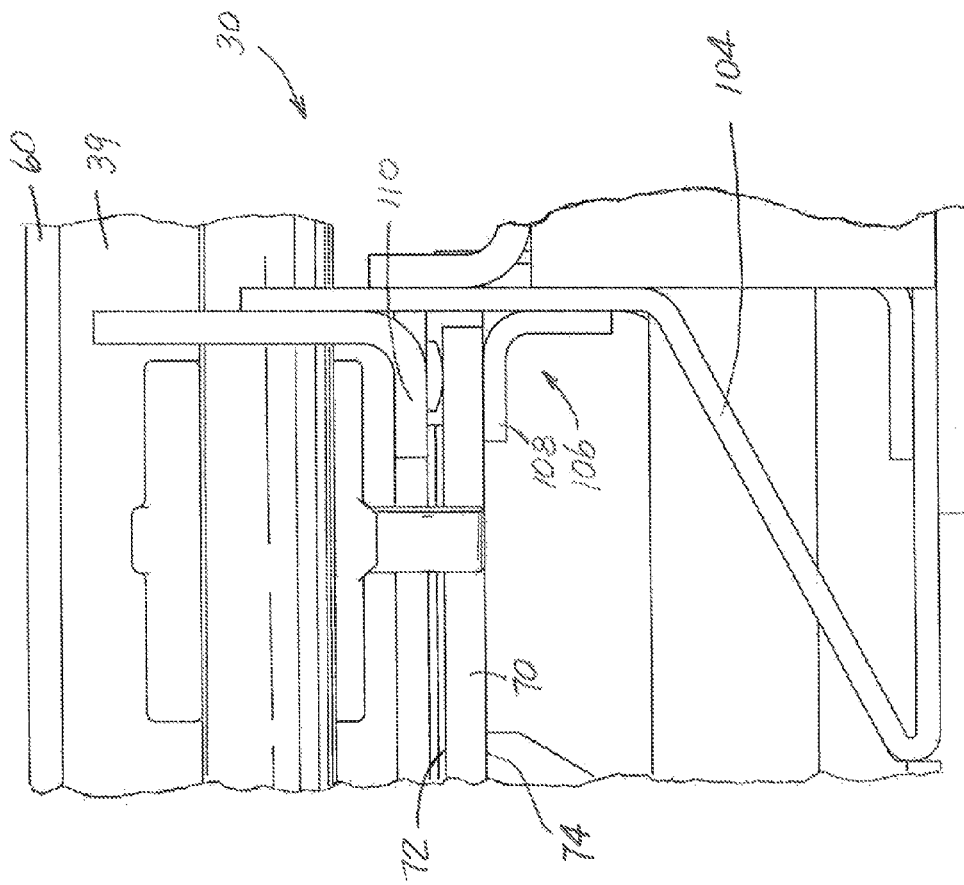
FIG. 8 is fragmentary and enlarged end view of a portion of the gate assembly of the present invention disclosure.

As shown in FIG. 2, projecting outwardly from the second end frame member 39 and extending in the direction the gate 70 moves toward an open position, frame 32 furthermore preferably includes generally parallel frame extensions 102 and 104. When viewed from an end of the gate assembly 30, the frame extensions 102 and 104 are mirror images of each other. Accordingly, only frame extension 104 will be described in detail. As shown in FIG. 8, each frame extension includes structure 106 projecting away from the discharge opening 34 (FIG. 3) for supporting the gate 70 when moved to an open position.

As shown by way of example in FIG. 8, structure 106 includes a ledge 108 which is secured to each frame extension 102, 104 beneath the lower surface 74 of gate 70 and projects inwardly toward a center of gate 70. The ledge 108 extends outwardly from the end frame member 39 and generally parallel to the direction of movement of the gate 70 toward the open position for a distance sufficient to support the opened gate 70. Preferably, and as shown in FIG. 8, structure 106 furthermore includes a hold down bracket 110 which extends generally parallel to and above ledge 108. Bracket 110 is disposed and designed to slidably engage with the upper surface 72 of gate 70, when gate 70 is moved toward the open position, and inhibits gate 70 from inadvertently tipping relative to the gate assembly frame 32.

As illustrated by way of example in FIGS. 4, 4A, 5, 6 and 6A, gate assembly 30 further includes a boot adapter or structure 120 disposed beneath the lower surface of gate 70 for influencing the commodity flowing or passing from the gate assembly 30. In the illustrated embodiment, adapter 120 is arranged in material receiving relation relative to the second discharge opening 34' of gate assembly 30. In a preferred embodiment, the boot adapter or structure 120 includes another series of horizontally slanted walls or baffles which, in one form, extend inwardly from a marginal edge 34a of the second discharge opening 34'.

The boot adapter or structure 120 can take different shapes and configurations without detracting or departing from the true spirit and novel scope of this invention disclosure. In the form shown in FIGS. 4 and 4A, the boot adapter or structure 120 includes a pair of generally parallel and opposed preferably metal longitudinally extending side members 136, 137 rigidly connected in a generally rectangular configuration to a pair of generally parallel and opposed end members 138 and 139 (FIGS. 5 and 6, respectively). In a preferred embodiment, an upper or inlet opening 121 defined by adapter 120 has a configuration 34a which proximates the marginal edge 34a of the second discharge opening 34' defined by the gate assembly frame 32.

In the illustrated embodiment, and when adapter 120 is operably coupled to the gate assembly 30, the side members 136, 137 of adapter 120 are disposed in operable combination with the side frame members 36 and 37 of gate assembly frame 32. Preferably, the side members 136 and 137 of adapter 120 are mirror images of each other. In the embodiment illustrated by way of example in FIGS. 4 and 4A, the side member 136, 137 of adapter 120 each include an upper outwardly extending and rigid and generally planar mounting flange 140 along with a horizontally slanted generally planar wall or baffle 144 extending or angling downwardly and away from the respective upper mounting flange 40 on each side member of adapter 120 and inwardly toward a center of the gate assembly 30. The slanted wall or baffle 144 on each side member of structure 120 extends inwardly toward a center of the discharge opening 34 and at acute angle α relative to a horizontal plane defined by the upper mounting flange 140 on each side member of structure 120. In one form, the slanted wall or baffle 144 of each side frame member extends downwardly and inwardly at angle preferably ranging between about 35 degrees and about 50 degrees relative to a horizontal plane defined by the upper mounting flange 40 on each side member of the discharge gate assembly 30.

The horizontally slanted wall or baffle 144 on each side member 136, 137 of adapter 120 terminates at a location where it is joined to a boot flange 148. As shown, the boot flange 148 on each side frame member 136, 137 on the adapter 120 is spaced from but extends in the same direction and in generally parallel relation with the respective mounting flange 140. Preferably, the mounting flange 140, the horizontally slanted wall or baffle 144 and the boot flange 148 are integrally formed with each other. Moreover, the boot flanges 148 on the side members 136, 137 of adapter 120 are arranged in generally coplanar relationship relative to each other.

Turning again to FIG. 5, the embodiment of the boot adapter 120 illustrated therein, further includes a first end member 138 which, when adapter 120 is operably coupled to the gate assembly 30, is disposed in operable combination with the end frame member 38 of frame assembly 32. In the embodiment shown by way of example in FIG. 5, end member 138 of adapter 120 includes an upper outwardly extending, rigid and generally planar mounting flange 150. Notably, the upper mounting flange 150 of the end member 138 is arranged generally coplanar with the mounting flange 140 on frame members 136 and 137.

As illustrated in FIG. 5, end member 138 of adapter 120 further includes a horizontally slanted generally planar wall or baffle 154 extending downwardly and away from the respective upper mounting flange 150 of end member 138 and inwardly toward the center of the gate assembly 30. In a preferred embodiment, the slanted wall or baffle 154 on the end member 138 of adapter 120 angles downwardly and inwardly toward the center of the gate assembly 30 and at acute angle α which is generally equal to the acute angle α defined between the slanted wall or baffle 144 and the mounting flange 140 of each side member 136, 137 of adapter 120.

The horizontally slanted wall or baffle 154 on the end member 138 of adapter 120 terminates at a location where it is joined to a boot flange 158. The boot flange 158 on the first end member 138 of adapter 120 is spaced from but extends in the same direction and in generally parallel relation with the respective mounting flange 150. Preferably, the mounting flange 150, the slanted wall or baffle 154 and the boot flange 158 are integrally formed with each other. To facilitate having a discharge boot (not shown) abutted thereto when commodity is to be discharged from the hopper 12 (FIG. 1) through gate assembly 30, the boot flange 158 on the end member 138 of adapter 120 is preferably arranged in generally coplanar relation relative to the boot flanges 148 on the side members 136 and 137 of adapter 120.

As mentioned above, the preferred embodiment of boot adapter 120 also includes end member 139. As shown by way of example in FIG. 6, when adapter 120 is operably coupled to the gate assembly 30, end member 139 is disposed in operable combination with the lower portion 39l of the end frame member 39 of frame assembly 32. In the embodiment shown by way of example in FIG. 6, end member 139 of adapter 120 includes an upper outwardly extending, rigid and generally planar mounting flange 160. Notably, the upper mounting flange 160 on the end member 139 of adapter 120 is arranged in generally coplanar relation with the mounting flange 140 on each side frame member 136, 137 and the mounting flange 150 on the end frame member 138 of adapter 120.

As illustrated in FIG. 6, end member 139 of adapter 120 further includes a planar wall 164 depending from the respective upper mounting flange 160 at an angle approximating 90 degrees. The wall or baffle 164 on the end member 139 of adapter 120 terminates at a location where it is joined to a boot flange 168. The boot flange 168 on the end member 139 of adapter 120 is spaced from but extends in the same direction and in generally parallel relation with the respective mounting flange 160. Preferably, the mounting flange 160, wall 164 and the boot flange 168 are integrally formed with each other. Moreover, the boot flange 168 of the end member 139 of structure 120 is preferably arranged in generally coplanar relation relative to the boot flange 148 on the side members 136 and 137 and the boot flange 158 on end member 138 of adapter 120 to allow an unloading boot B (FIG. 4) to be abutted thereagainst to effect unloading of the hopper 12 (FIG. 1).

In the embodiment illustrated by way of example, the terminal edges of the slanted walls 144 on each side member 136, 137 (FIGS. 4 and 4A) along with the terminal edge of the slanted wall 154 on the end member 138 (FIG. 5) in combination with wall 164 of end member 139 (FIG. 6) combine to define another discharge opening 34" (FIG. 6A) having a generally rectangular marginal edge 34a" for gate assembly 30. This third discharge opening 34" is disposed below the lower surface of the gate 70 and defines a generally smaller area than does the discharge opening 34' whereby serving to further influence, restrict or otherwise baffle the flow of commodity passing from the discharge gate assembly 30. In one embodiment, the area of the third discharge opening 34" is about 55% smaller than the area of the first discharge opening 34. In one example, the area of the third discharge opening 34" measures approximately 496 square inches.

The boot adapter 120 is releasably suspended below the gate assembly 30 through structure 170 which can embody any of a myriad of designs without detracting or departing from the novel spirit and broad scope of this invention disclosure. Suffice it to say, the adapter 120 is to be releasably suspended in material receiving relation relative to and below the discharge opening defined by the gate assembly using minimal equipment and personnel and in a manner permitting the adapter 120 to be easily removed from gate assembly 30 in the event the railcar 10 (FIG. 1) changes service again.

Figure 9:
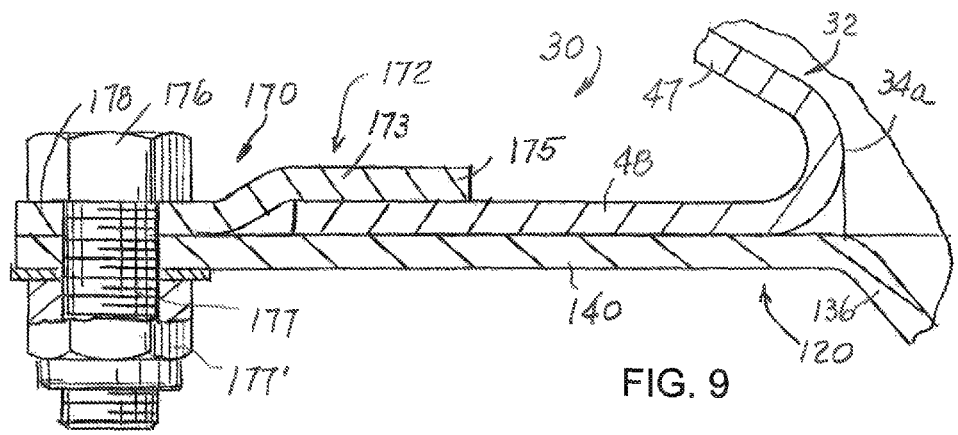
FIG. 9 is an enlarged view of the area elliptically encompassed in phantom lines in FIG. 4.

In the form illustrated in FIG. 9, structure 170 includes a clamping mechanism 172 used to releasably secure the boot adapter 120 to the frame assembly 32. In the illustrated example, and as will be appreciated from an understanding of this disclosure, more than one clamping mechanism 172 can be arranged in operable combination with each mounting flange of the boot adapter 120. Since each clamping mechanism is preferably similar, however, only one clamping mechanism will be discussed in detail.

In the embodiment illustrated by way of example in FIG. 9, each clamping mechanism 172 includes a clamping strip or member 173. Toward one end 175, the clamping strip 173 overlies a lengthwise portion of and releasably clamps against a free end of a respective boot flange of one of the frame members on the gate assembly frame 32. A conventional and well known fastener 176 including a threaded bolt 177 and nut 177' can be used to effect the desired ends. The clamping member 173 is configured such that an opposite end 178 overlies and is pressed or clamped against the respective mounting flange on adapter 120 through tightening of the fastener 176 whereby releasably clamping and securing the boot adapter 120 to at least two opposed frame members of the gate assembly 32.

Figure 10:
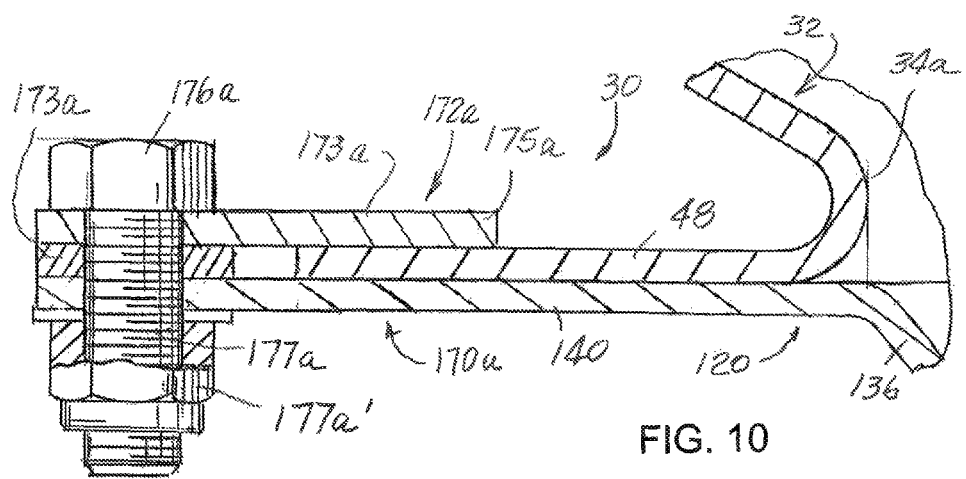
FIG. 10 is an enlarged view similar to FIG. 9 showing alternative structure for releasably affixing an adapter to a gate assembly.

In an alternative embodiment illustrated by way of example in FIG. 10, the structure for releasably suspending the adapter 120 below the gate assembly 30 is indicated generally by reference numeral 170a. This alternative structure 170 includes a clamping mechanism 172a comprised of a clamping strip member 173a along with a spacer 173a. Toward one end 175a, the clamping strip 173a overlies a lengthwise portion of and releasably clamps against a free end of a respective boot flange on the gate assembly frame 32. A conventional and well known fastener 176a including a threaded bolt 177a and nut 177a' can be used to effect the desired ends. The clamping member 172a is configured such that an opposite end 178a overlies and is pressed or clamped against the spacer 173a and respective mounting flange on adapter 120 through tightening of the fastener 177a whereby releasably clamping and securing the boot adapter 120 to at least two opposed frame members of the gate assembly 32.

Figure 11:
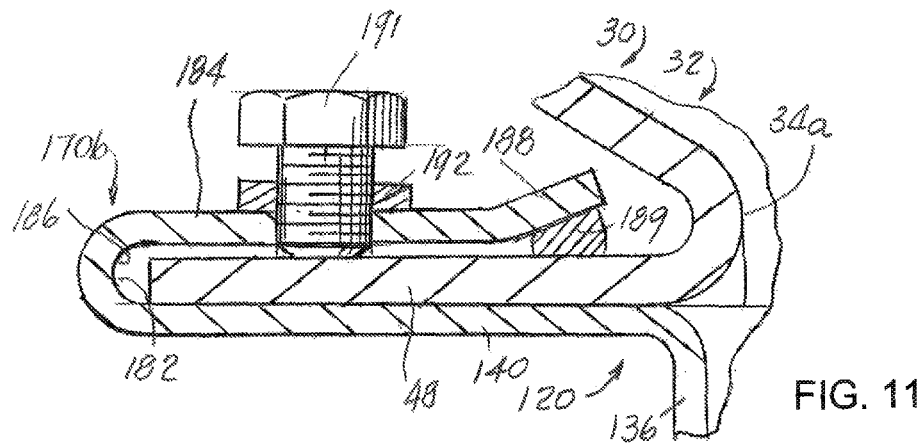
FIG. 11 is an enlarged view similar to FIG. 9 showing other alternative structure for releasably affixing an adapter to a gate assembly.

FIG. 11 illustrates another alternative embodiment of the structure used to releasably suspend the boot adapter 120 on the gate assembly frame 32. In the embodiment illustrated by way of example in FIG. 11, such alternative structure is generally designed by reference numeral 170b. In the embodiment of the structure used to releasably suspend the boot adapter 120 on the gate assembly frame 32 and illustrated by way of example in FIG. 11, an upper mounting flange of at least two opposed members of the boot adapter 120 are each provided so as to allow the boot adapter 120 to be slidably mounted on and along the lower flanges of at least two opposed frame members of the gate assembly 30 and thereafter releasably secured in position. Preferably, the upturned end of the mounting flange extends the majority of if not the full length of each respective mounting member of the boot adapter 120 on which it is provided. In one form, an upturned edge of the adapter mounting flange can be furthermore provided on a third member of the boot adapter 120, if so desired. The structure 170c arranged or otherwise provided on each of the member of the boot adapter 120 are preferably identical relative to each other. As such, only the structure 170b associated with but a single member of the boot adapter will be discussed in detail.

In the example shown in FIG. 11, structure 170b defines an inwardly directed opening 182. Opening 182 is defined between the mounting flange 140 on a member of the boot adapter 120 and an inwardly turned upper member 184 preferably joined to the mounting flange on the respective member of the boot adapter 120. Suffice it to say, the opening 182 of each piece of attachment hardware 180 is sized such that it slidably accommodates the boot flange of the respective frame member of the gate assembly 32 while limiting vertical displacement of the mounting flange of the respective member of the adapter 120 therewithin Notably, each structure 180 defines a limit stop 186. The distance between the limit stops 186 on two opposed members of the adapter 120 is generally equal to or slightly greater than the distance between the distal ends of two respective boot flanges of the opposed frame members of the gate assembly frame 32 used to carry and support the boot adapter 120. As shown by way of example in FIG. 11, and in a preferred embodiment, the upper member 184 of structure 170b has an upwardly angled free edge 188 along substantially the length thereof for facilitating mounting of the boot adapter 120 to the gate assembly frame.

Structure 170b and, thus, the boot adapter 120, is releasably fastened or otherwise releasably secured to opposed boot flanges on those frame members carrying the boot adapter 120. The releasable securement of structure 170b and, thus, the boot adapter 120 can be effected in different ways without seriously detracting or departing from the spirit and scope of this invention disclosure. For example, and after boot adapter 120 is slidably mounted in operable combination with the gate assembly frame 32, structure 170b can be welded as at 189 in one or several locations along the boot flanges on those frame members carrying the boot adapter 120. Of course, and simply by removing, grinding off or otherwise breaking such welds, the boot adapter 120 can be removed from the gate assembly frame whereby returning the gate assembly 30 to its original purpose and service.

In another alternative embodiment shown in FIG. 11, structure 170b and, thus, the boot adapter 120 is releasably fastened or otherwise releasably secured to opposed boot flanges on those frame members carrying the boot adapter 120 through use of one or more fasteners 190 arranged in operable combination with the attachment hardware. More specifically, a conventional threaded fastener 191 is threadably arranged for rotation within the upper inwardly turned upper member 184 above the respective boot flange of the frame member on which the adapter 120 is slidably mounted. After boot adapter 120 is slidably mounted in operable combination with the gate assembly frame 32, the fastener 191 is rotated whereby releasably clamping and securing the adapter 120 to the boot flanges of at least two opposed frame members of the gate assembly 32. A locking or jam nut 192 releasably maintains the rotational position and clamping function of the fastener 191. Of course, after releasing the fastener 191 and jam nut 192, the boot adapter 120 can be removed from the gate assembly frame 32 whereby returning the gate assembly 30 to its original purpose and service.

Although structure 170b was described as being provided on at least two members of the boot adapter 120, it is furthermore possible to provide the same or similar structure along a third member of the boot adapter 120 such that when the boot adapter is arranged in operable combination with the gate assembly frame 32, the third piece or structure 170b serves to limit the intrusion of contaminants, i.e. moisture, dust and related debris, about the upper periphery of the boot adapter 120. In this regard, suitable seal structure can be provided about the remaining side of the boot adapter 120 to limit the intrusion of contaminants, i.e. moisture, dust and related debris, about the upper periphery of the boot adapter 120.

Figure 11B:
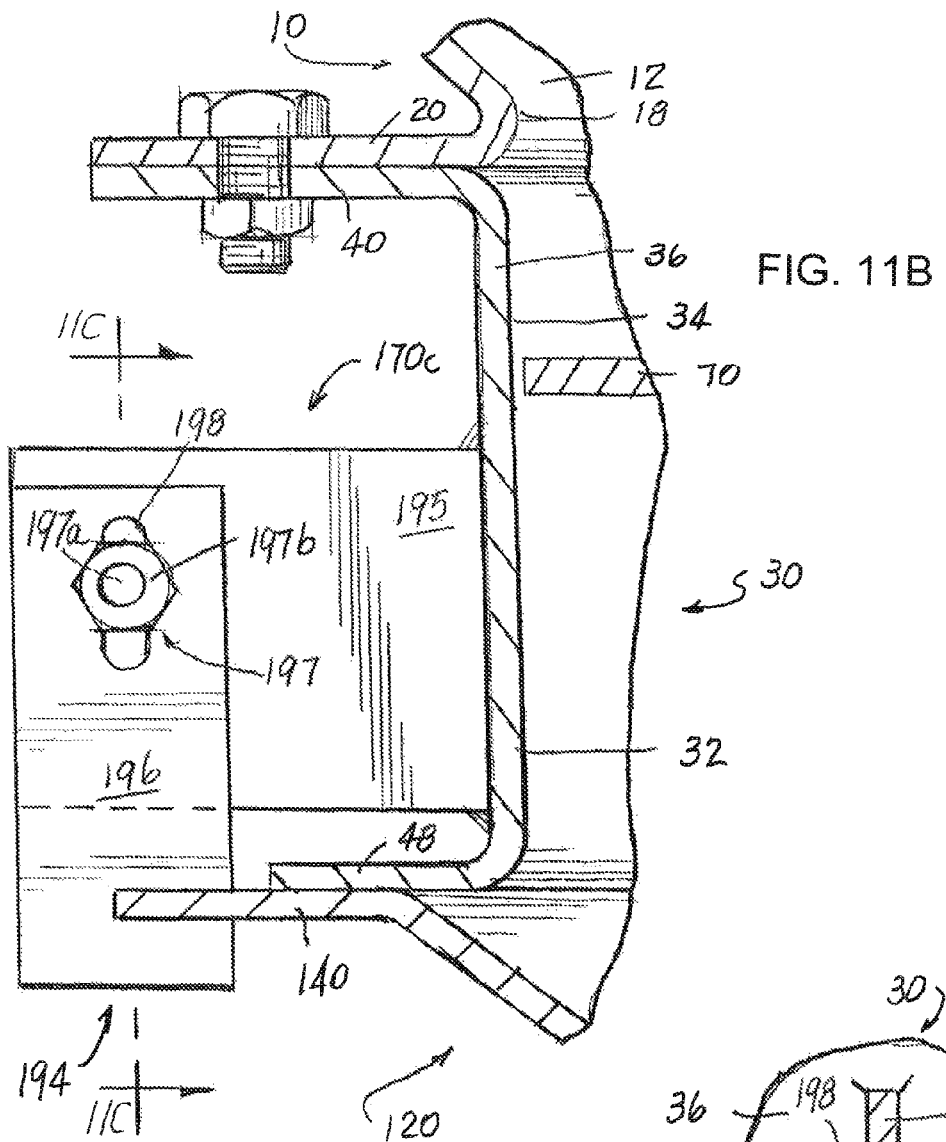
FIG. 11B is enlarged partially sectioned view of that area encircled in FIG. 12.
Figure 11C:
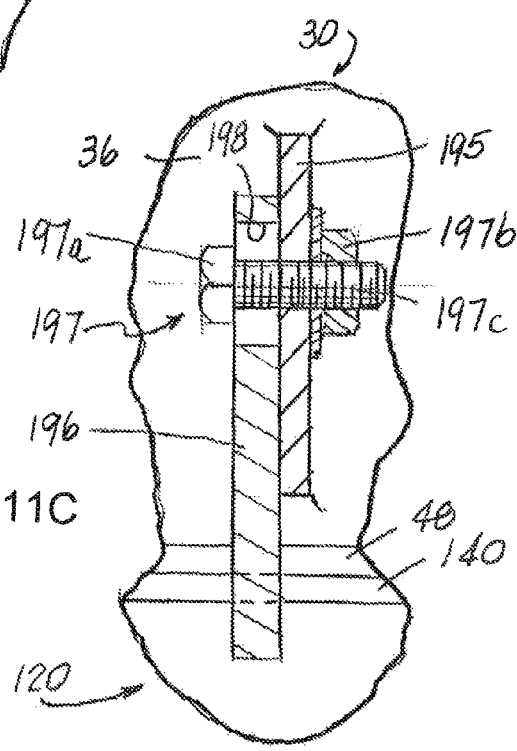
FIG. 11C is an enlarged sectional view taken along line 11C-11C of FIG. 11B.

FIGS. 11A through 11C schematically illustrate still another embodiment of the structure used to releasably suspend the boot adapter 120 on the gate assembly frame 32. In the embodiment illustrated by way of example in FIGS. 11A through 11C, such alternative structure is generally designed by reference numeral 170c. In this alternative embodiment, structure 170c includes a series of bracket assemblies 194 between the gate assembly frame 32 and the adapter 120 for releasably suspending the boot adapter 120 below gate assembly 30. Preferably, a grouping of bracket assemblies are 194 are provided along opposed sides of and across a forward end of the frame assembly 32 for releasably suspending the adapter 120 below and in material receiving relation relative to the frame assembly 32. In a preferred form, the bracket assemblies 194 are substantially identical relative to each other and, thus, only one bracket assembly will be described in detail.

Turning to FIGS. 11B and 11C, each bracket assembly 194 includes a pair of cooperating brackets 195 and 196. As shown in FIG. 11B, toward one end, bracket 195 is suitably secured, as by welding and the like, to and extends away in a generally perpendicular direction from the frame assembly 32. Toward an outer fee end, bracket 195 is releasably secured to bracket 196. Bracket 196 depends from the free end of bracket 195 and toward the adapter 120. Toward a lower end thereof, bracket 196 is configured to have the mounting flange of a respective member of the boot adapter 120 secured thereto and supported thereby.

As shown in FIGS. 11B and 11C, a suitable fastener 197 releasably secures the brackets 195 and 196 to each other. Fastener 197 preferably includes a conventional threaded bolt 197a and nut 197b. In a preferred form, one of the brackets 195, 196 is provided with a vertically elongated slot 198 through which a shank 197c of bolt 197a extends. As such, the elongated slot 198 permits vertical adjustment of the adapter 120 relative to the frame assembly 32 to compensate for tolerances and the like and to ensure the adapter 120 can be suspended in a proper operable relation relative to frame assembly 32.

Returning again to FIG. 2, gate assembly 30 further includes a manually actuated operating shaft assembly 210 mounted for rotation about a fixed axis 212 preferably on the frame extensions 102 and 104 of the gate frame 32. The rotationally fixed axis 212 of the operating shaft assembly 210 is disposed in spaced generally parallel relationship from the end frame member 39 of the gate assembly frame 32. The operating shaft assembly 210 is operably coupled or connected to gate 70 such that rotation of the operating shaft assembly 210 is transmuted to linear movement of the gate 70.

The operating shaft assembly 210 extends transversely across the path of movement of gate 70 and has opposed ends which, after the gate assembly 30 is secured to car 10, are operator accessible from either side of car 10. In the illustrated embodiment, the operating shaft assembly 210 is disposed beneath the predetermined path of movement of the gate 70.

Figure 12:
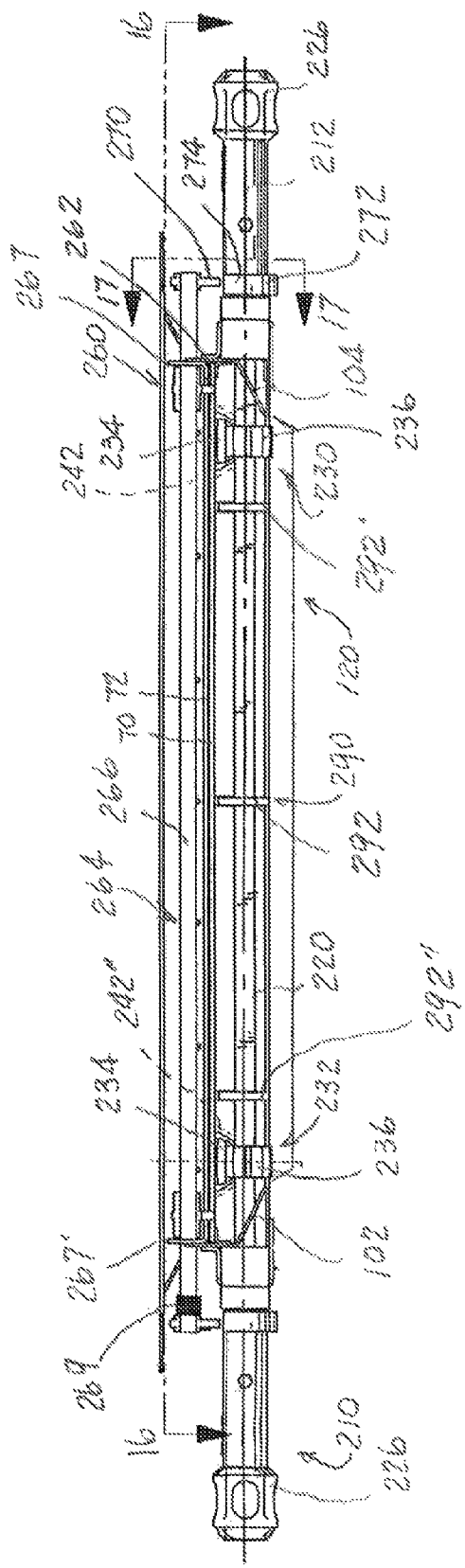
FIG. 12 is an end view of the gate assembly of the present invention disclosure.

As shown in FIG. 12, the operating shaft assembly 210 preferably includes an elongated operating shaft 220 rotatable about axis 212 with operating handles or capstans 226 connected to opposite ends thereof. As is known, the operating handles 226 rotatably mount the operating shaft assembly 210 to the frame extensions 102, 104 of the gate assembly frame 32. In a most preferred form, the capstans or operating handles 226 are releasably secured to the shaft 220.

A drive mechanism 230 operably couples the operating shaft assembly 210 to the gate 70. In the illustrated embodiment, drive mechanism 230 includes a rack and pinion assembly 232. Preferably, assembly 232 includes a pair of laterally spaced racks 234 fixed to the lower surface 74 of gate 70. A pair of pinions 236 are slidably received about shaft 220 and are arranged in meshing engagement with the racks 234. Thus, the racks 234 are simultaneously moved in timed relation relative to each other by the pinions 236. The racks 234 preferably embody a design similar to that illustrated in U.S. Design Pat. No. 427,741 assigned to Miner Enterprises, Inc.; the full disclosure of which is incorporated herein by reference.

Figure 13:
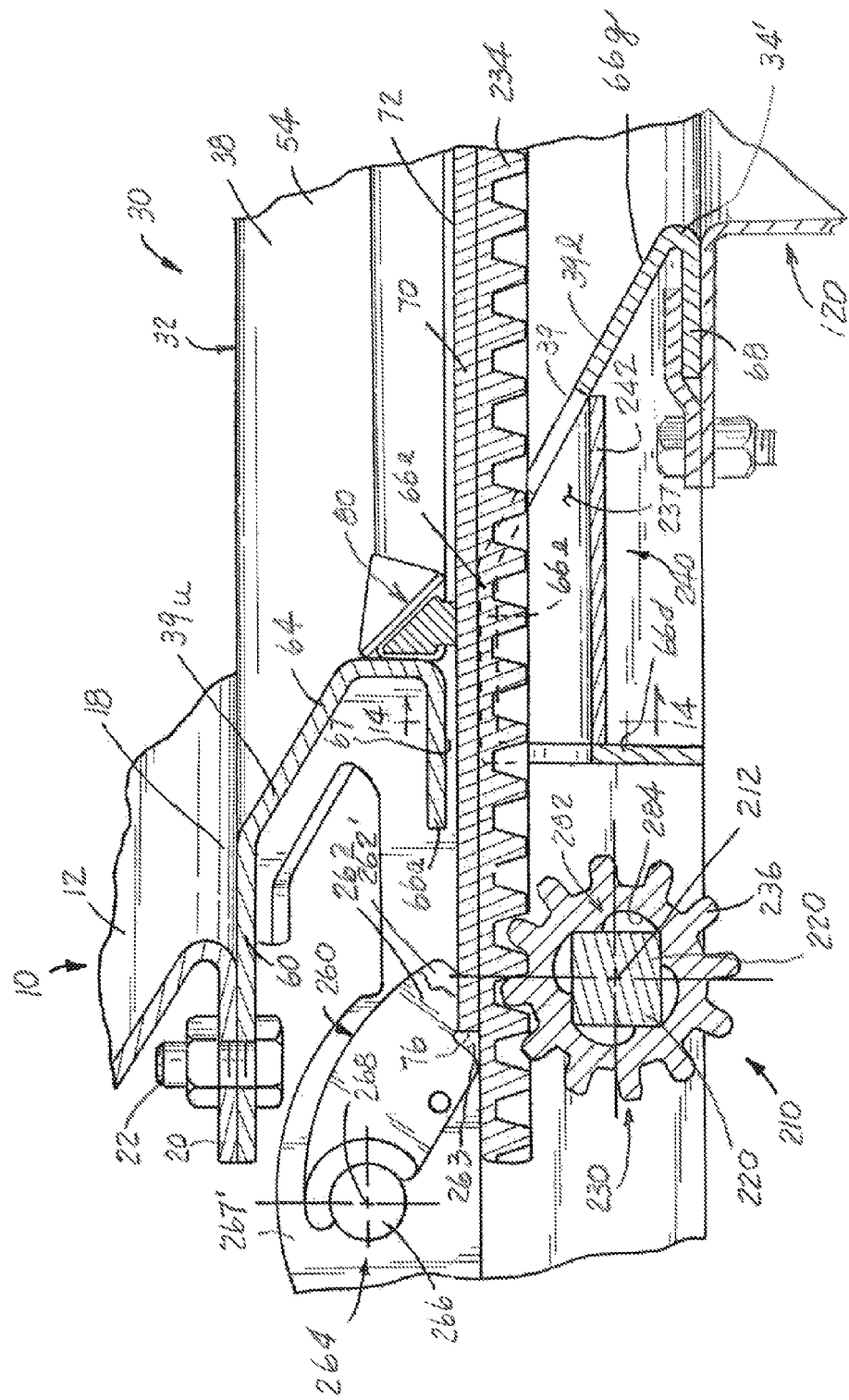
FIG. 13 is an enlarged sectional view taken along line 13-13 of FIG. 2.
Figure 14:
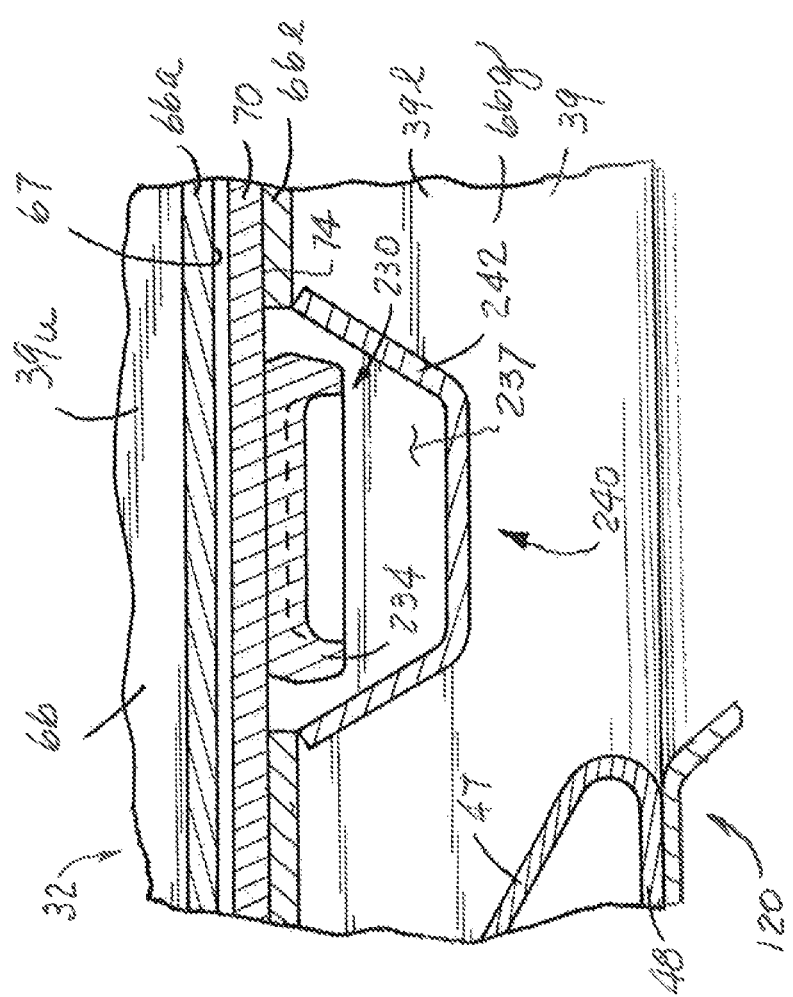
FIG. 14 is an enlarged sectional view, with some parts removed, taken along line 14-14 of FIG. 13.

In the example shown in FIG. 13, the operating shaft assembly 210 along with the pinions 236 of drive mechanism 230 are horizontally arranged to that side of the depending vertical wall 66d of the lower portion 39l of the second end frame member 39 opposite from the discharge opening 34'. As such, and as shown in FIGS. 13 and 14, because the racks 234 of drive mechanism 230 are preferably mounted to the underside 74 of the gate 70, a pair of laterally spaced openings 237 (with only one being shown in FIGS. 13, 14 and 15) are provided in the lower portion 39l of the second end frame 39 defining the transverse opening or slot 67 and the slanted wall 66g associated with the lower portion 39l of the second end frame member 39 whereby allowing the racks 234 of drive mechanism 230 to move endwise therethrough. Such openings 237 would normally weaken or reduce the stiffness and strength of the gate frame 32.

Of course, too much reduction in the stiffness and rigidity of the gate frame 32 can adversely affect the gate 70, resulting in excessive deflection which may adversely affect operation of the gate assembly 30 and/or sealing of the gate 70 with various sealing devices arranged above an upper surface 72 of the gate 70. As such, and with the openings 237 in the depending wall 66d of the lower portion 39l of the end frame member 39 and the slanted wall 66g associated therewith notwithstanding, the gate frame assembly 32 is preferably designed to facilitate support and inhibit transverse bending of that end frame member 39 defining the transverse opening or slot 67 to enhance operation of the gate assembly 30 while maintaining the horizontal wall 66e (FIGS. 6, 13 and 14) of the lower portion 39l of the end wall 39 in close supportive relation relative to the underside 74 of gate 70.

Particularly in those areas defining the openings 237, frame 32 advantageously includes structure 240 to further enhance rigidity and stiffness to the lower portion 39l of the end frame 39. In a preferred form, structure 240 includes a pair of laterally spaced braces 242' and 242" (FIG. 13). In a preferred embodiment, and to reduce manufacturing costs, the braces 242' and 242" of structure 250 are substantially identical. Thus, a detailed description of only brace 242' will be provided.

In the form shown in FIGS. 13 and 14, each brace of structure 240 is preferably formed from steel and the like and bridges or spans the horizontal distance measured between the slanted wall or baffle 66g and the generally vertical wall 66d of the lower portion 39l of the end wall 39. In the form shown by way of example in FIG. 14, each brace of structure 240 has a generally U-shaped and hollow cross-sectional configuration arranged in at least partially surrounding relation relative to the lengthwise portion of the respective rack 234 of drive mechanism 230 passing endwise therethrough. The upper horizontal edges of each brace of structure 240 are attached, preferably as by welding or the like, to the horizontal wall 66e of the lower portion 39l of the end wall 39 of frame 32. Moreover, the edges around opposed ends of each brace of structure 240 are attached, preferably as by welding or the like, to the depending wall 66d of the lower portion 39l of the end wall 39 of frame 32 and the slanting wall 66g (FIG. 13).

Figure 15:
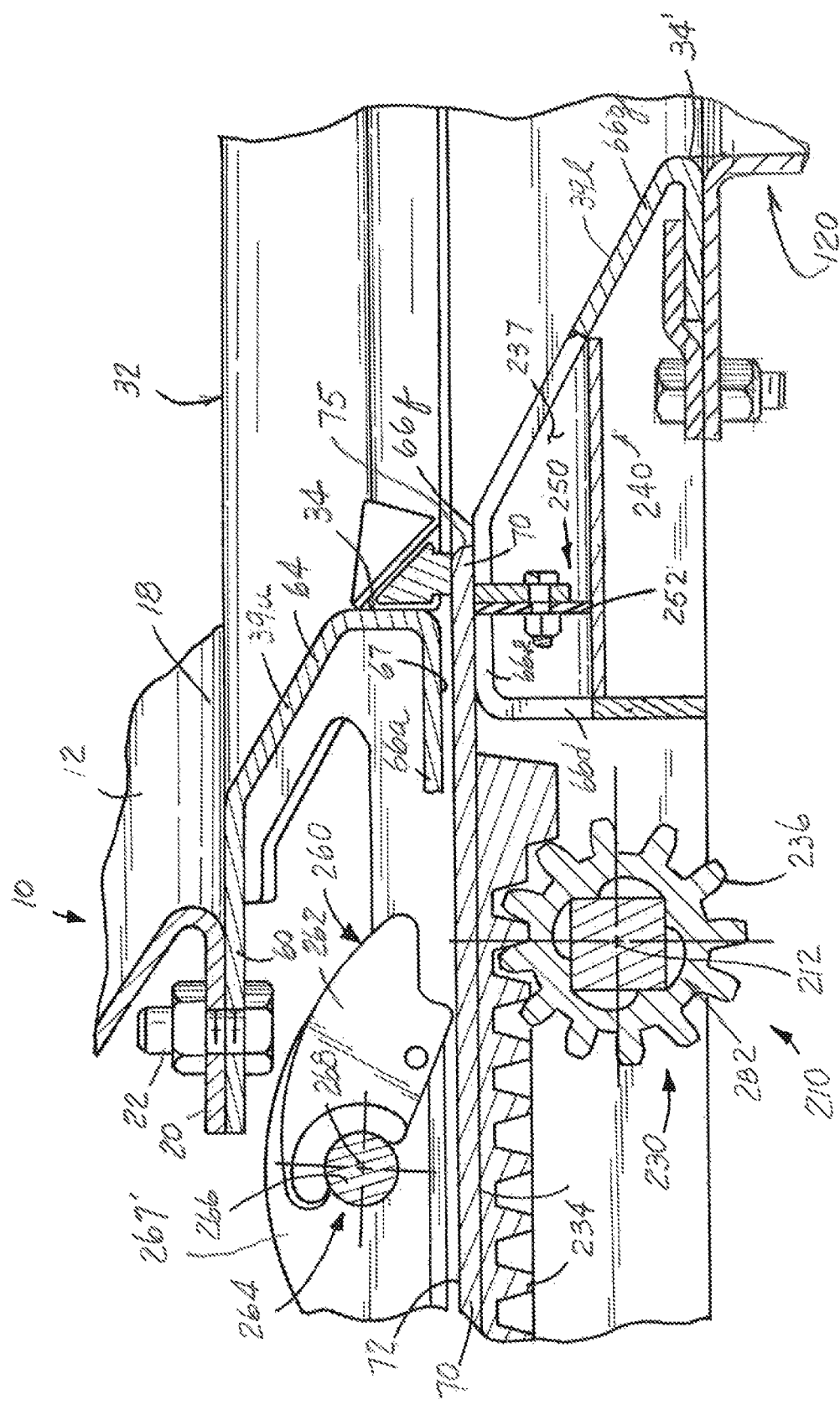
FIG. 15 is a sectional view similar to FIG. 13 showing the gate of the gate assembly in an open position.

In the embodiment illustrated in FIG. 15, gate 70 carries seal structure 250. In the form illustrated by way of example in FIG. 15, seal structure 250 includes a pair of substantially identical laterally spaced free-ended and flexible seal members 252 (with only one being shown in FIG. 15). The seals 252 are preferably formed from rubber, plastic, nylon or the like flexible material. In the embodiment shown by way of example in FIG. 15, the seal members 252 of structure 250 depend from an underside 74 of gate 70 and are horizontally spaced from but arranged in generally fore-and-aft alignment with the ends of racks 234 of drive mechanism 230 (FIG. 2).

Preferably, each seal member 252 has an outer edge or profile which generally corresponds to and operably engages with the inner cross-sectional profile of the respective hollow brace 240 in the lower portion 39l of the second end frame member 39 when the gate 70 is moved to an open position. Suffice it to say, and as shown in FIG. 15, when gate 70 is moved to its open position, seal structure 250 serves to inhibit commodity from passing through either opening 237 in the lower portion 39l of the end frame member 39 and inadvertently falling or being discharged or leaked outside the discharge opening 34'.

Movement of the gate 70 from a closed position toward an open position along its fixed path of movement is influenced by a lock assembly 260. The purpose of the lock assembly 260 is to releasably hold gate 70 against movement toward an open position until the lock assembly 260 is purposefully released by the operator. With the present invention disclosure, and in compliance with AAR Standards, lock assembly 260 is preferably configured such that it is initially released in response to operation of the operating shaft assembly 210 automatically followed by movement of the gate 70 toward an open position. That is, unlatching of the lock assembly 260 and opening of the gate 70 are preferably affected in sequential order relative to each other and in response to rotation of the operating shaft assembly 210.

Figure 16:
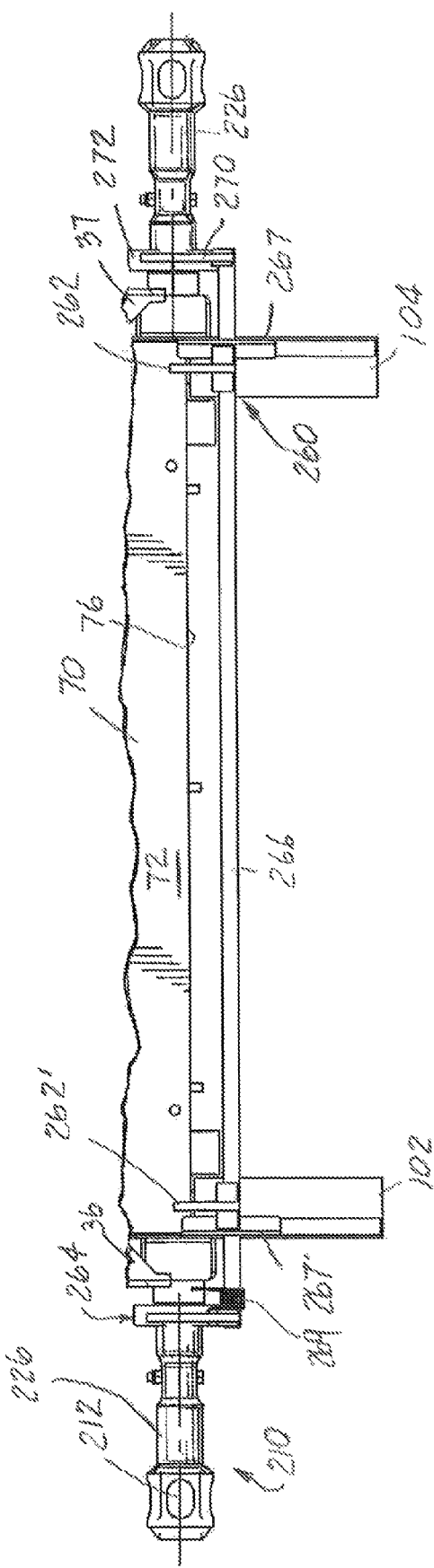
FIG. 16 is a fragmentary top plan view taken along line 16-16 of FIG. 12 showing one form of lock assembly arranged in operable combination with the gate assembly

In one form, lock assembly 260 is preferably designed as a subassembly and can be fabricated independent of the frame 32 and subsequently added thereto. As shown in FIGS. 12 and 16, lock assembly 260 includes a stop 262 mounted for movement between a first position (FIG. 13), wherein stop 262 is disposed in the path of movement of the gate 70 to inhibit inadvertent movement of the gate 70 from the closed position toward the open position, and a second position (FIG. 15), wherein stop 262 is removed from the path of movement of the gate 70. Lock assembly 260 further includes a mechanical system 264 for moving the stop 262 between the first and second positions in timed sequential movement relative to movement of the gate 70 toward the open position.

In the embodiment illustrated by way of example in FIG. 16, the mechanical system 264 includes a rockshaft 266 with the stop 262 secured for movement therewith. As shown in FIGS. 12, 13, 15 and 16, after lock assembly 260 is secured to frame 32, shaft 266 is preferably arranged above the upper surface 72 of the gate 70 and generally parallel thereto. Shaft 266 is mounted for oscillatory movement about a fixed axis 268 extending generally parallel to axis 212 about which shaft assembly 210 turns. In one form, a pair of laterally spaced brackets 267 and 267', secured to and extending upwardly from the frame extensions 102 and 104, respectively, mount the rockshaft 266 to the gate assembly frame 32. Preferably, when subassembly 260 is secured to the gate assembly frame 32, the rockshaft 266 thereof is disposed above and downstream of a rearmost edge 76 of the gate 70 (FIG. 16), when the gate 70 is in the closed position to promote visualization of the lock assembly 260 relative to gate 70. Moreover, the rockshaft 266 is spaced above and lengthwise from the shaft assembly 210.

Preferably, and as shown in FIG. 13, when gate 70 is closed, stop 262 depends angularly downward from the rockshaft 266 and a free end of the stop 262 extends toward and into positive engagement with the gate 70. Preferably, the free end of stop 262 is configured with a notch or recess 263 for engaging the edge 76 of the gate 60 while limiting angular movement of the stop 262 therepast. Preferably, the operative distance separating the notch 263 from the axis 268 of the rockshaft 266 is greater than the distance separating the axis 268 of the rockshaft 266 from the upper side or surface 72 of gate 70. Accordingly, when the stop 262 engages the gate 70, a wedging action is preferably created or established. In a preferred form, the rockshaft 256 is inhibited against axial shifting movements along axis 268 by any suitable means.

Preferably, and as illustrated in FIG. 16, lock assembly 260 further includes a second stop 262' arranged in laterally spaced relation from stop 262. Stop 262' is operated, rotated with and is carried by rockshaft 266 and is substantially similar to the stop 262 and, thus, no further detailed description need be provided for stop 152'.

Figure 17:
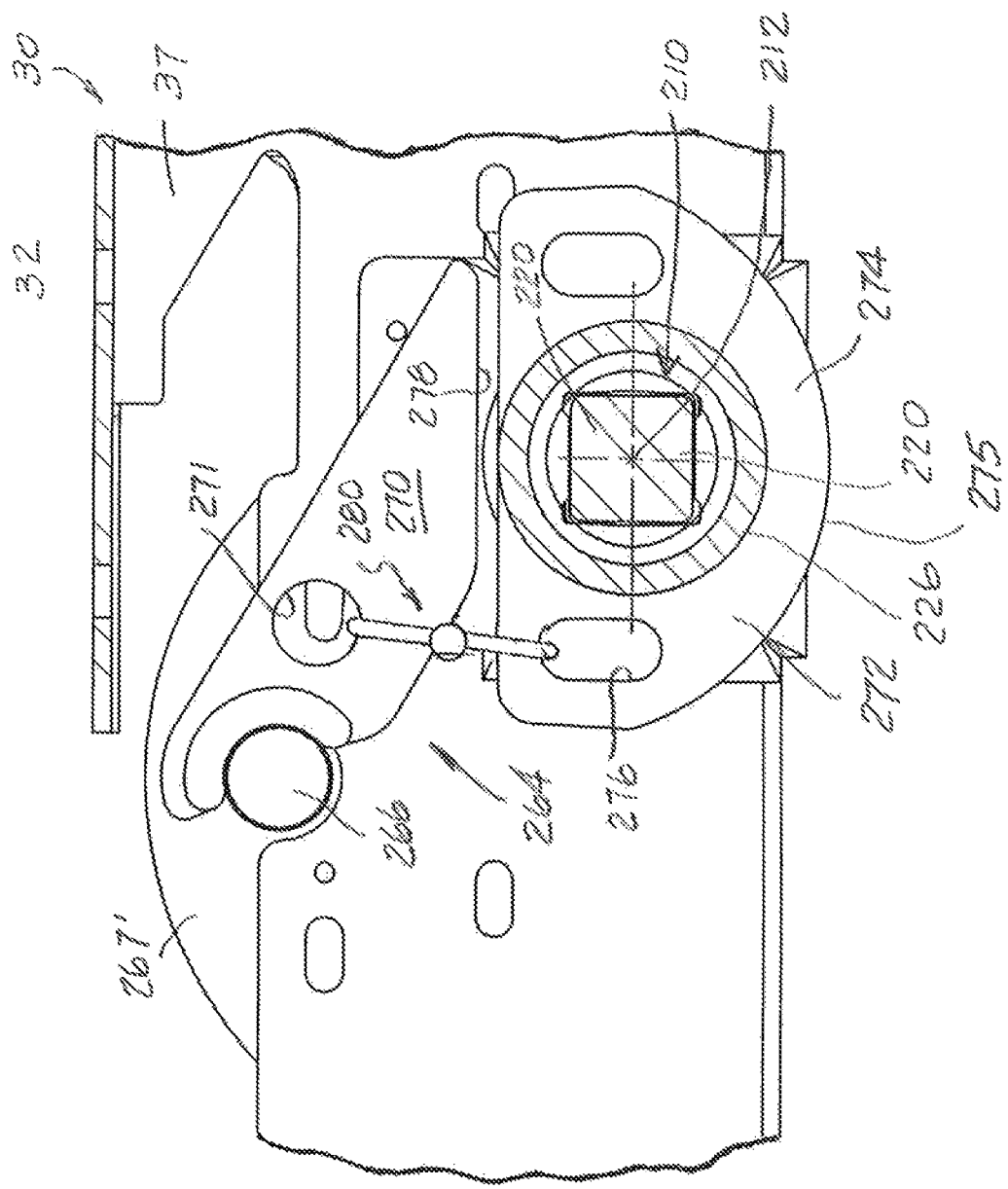
FIG. 17 is a fragmentary and enlarged sectional view taken along line 17-17 of FIG. 12.

As shown in FIG. 17, the mechanical system 264 for operating the lock assembly 260 (FIG. 13) in timed sequence with movement of the gate 70 further includes at least one cam follower 270 secured to and radially extending from rockshaft 266. The free end of the follower 270 is adapted to cooperate with cam structure 272 on shaft assembly 210 whereby the stop 262 of the lock assembly 260 will be positively displaced relative to the path of movement of the gate 70 upon rotation of the shaft assembly 130.

In the embodiment shown by way of example in FIG. 17, the cam structure 272 for displacing the stop 262 (FIG. 13) includes an actuating member or cam 274 provided to the side of the gate assembly frame 32 on at least one of the operating handles or capstans 226 of the operating shaft assembly 210. Such design increases the potential throw or movement of the lock assembly 260 (FIG. 13) while allowing the cam follower 270 of the mechanical system 264 to be advantageously disposed adjacent to the gate assembly frame 32. In the embodiment shown in FIGS. 12 and 16, another cam follower and associated cam structure is provided at the other end of the mechanical system 264 and operating shaft assembly 210.

Since the cam structure at each end of the operating shaft assembly 210 is substantially identical, only one actuating member or cam 274 will be described in detail. As shown in FIGS. 12, 16 and 17, each cam 274 is preferably formed as an integral part of the handle 226 on shaft assembly 210 and includes a peripheral surface 275 (FIG. 17). Notably, at least a portion of each cam 274 is larger in diameter and extends radially outward from that portion of the operating handle 226 preferably joined thereto. For purposes to be described below, each actuating member or cam 274 defines a throughbore or opening 276, having a closed margin, arranged in radially spaced relation relative to the rotational axis 212 of the operating shaft assembly 210.

Along its underside, the cam follower 270 includes a cam engaging surface 278 specifically configured to inhibit the follower 270 from binding against the peripheral surface 275 of the cam 274. Moreover, each cam follower 270 is preferably configured to promote arrangement of a tamper seal 280 (FIG. 17) in only one position of the lock assembly 260 (FIG. 13). In the embodiment shown in FIG. 17, each cam follower 270 defines an opening or hole 271 having a closed margin. In one form, the tamper seal 180 comprises a ribbon-like member adapted to be passed through the throughbore or slot 276 in the cam 274 and the opening or hole 271 in the cam follower 270, with opposite ends of the seal 280 being joined to each other to provide a visual indication of railcar tampering.

Besides being gravitationally urged into engagement with the gate 70, in a preferred embodiment, stop 262 is urged into positive engagement with the gate 70 so as to inhibit inadvertent release of the lock assembly 260 as the railcar travels between locations. Returning to FIGS. 12 and 16, shaft 266 of the mechanical system 264 is resiliently biased by a suitable torsion spring 269 operably engagable between the gate assembly frame 32 and the adjacent cam follower 270 to resiliently urge stop 262 toward its first position, thus, preventing stop 262 from inadvertent disengagement from gate 70. The preferred spring arrangement 269 furthermore allows the follower 270 to advantageously remain in operative engagement with the periphery of the cam structure 272 during turning rotational movements of the operating shaft assembly 210.

Preferably, a lost motion mechanism 282 is operably disposed between the operating shaft assembly 210 and the mechanical system 264 for operating the lock assembly 260 so as to effect sequential movement of the lock assembly stop 262 and the gate 70 in predetermined relation relative to each other. The purpose of the lost motion mechanism 282 is to permit the operating shaft assembly 210 to rotate about an angle of free rotation without corresponding movement of the gate 70. As used herein, the term "free rotation" refers to that rotation of the operating shaft assembly 210 suitable to unlatch the lock assembly 260 from the gate 70 prior to effecting displacement of the gate 70 toward an open position.

The lost motion mechanism 282 can take different designs without detracting or departing from the spirit and scope of this invention disclosure. In the embodiment illustrated by way of example in FIGS. 13 and 18, shaft 220 of the operating shaft assembly 210 has a generally square cross-sectional configuration. Moreover, in the embodiment shown, the pinions 236 of drive mechanism 230 each define a slip socket or slotted configuration 284 specifically related to the cross-sectional configuration of and through which the shaft 220 of shaft assembly 210 endwise passes. The slip socket configuration 284 in each pinion 236 has a duodecimal surface configuration preferably centered about the fixed axis 212 of operating shaft assembly 210 and defines a rotary path for the operating shaft relative to each pinion 236 of drive mechanism. Without incurring serious redesign, an alternative version of the lost motion mechanism 282 can be incorporated into the operating handles or capstans 226 of the operating shaft assembly 210.

Figure 18:
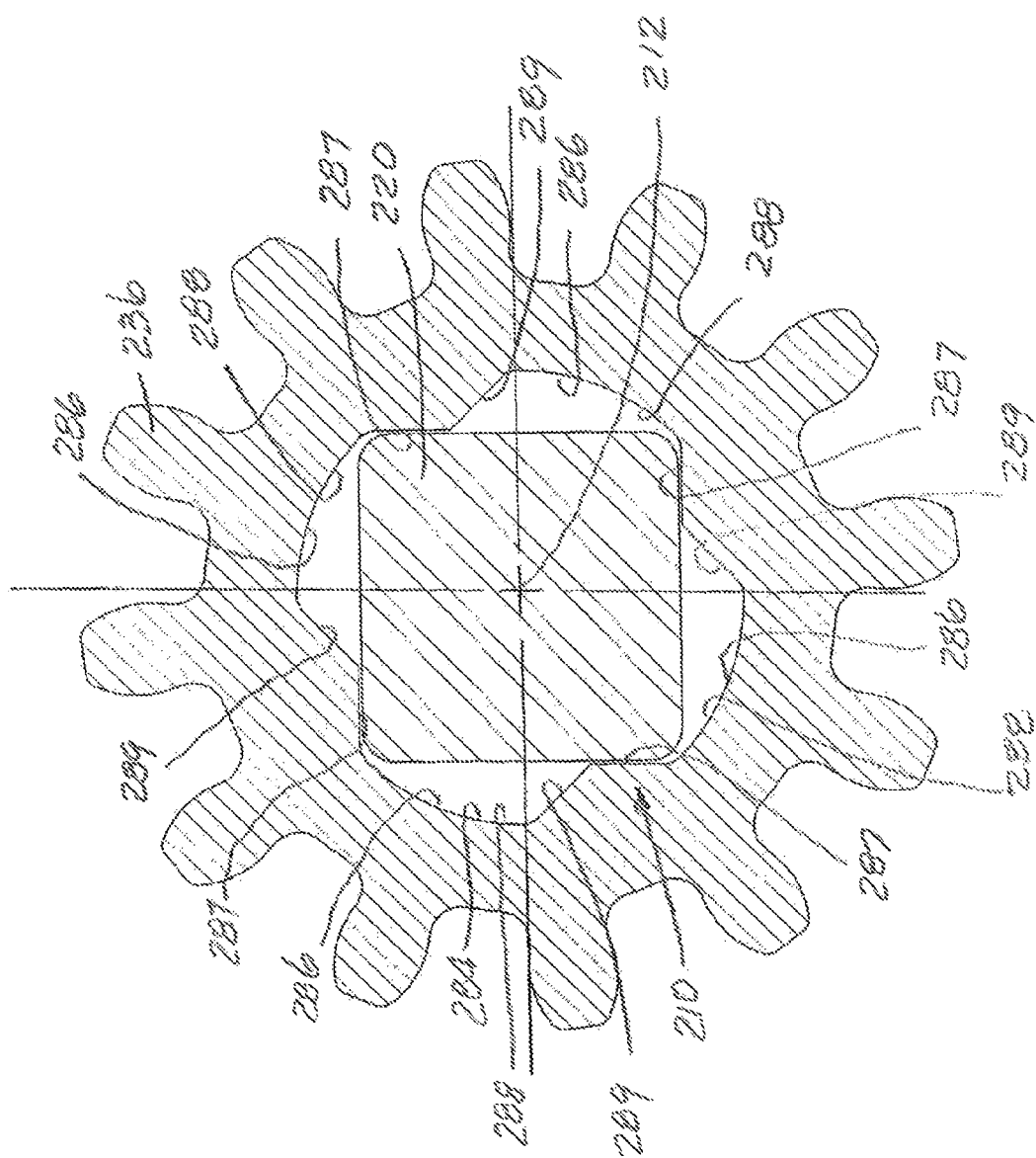
FIG. 18 is an enlarged elevational view of a pinion forming part of a drive mechanism for moving the gate between closed and open positions.

As shown by way of example in FIG. 18, because shaft 220 has a square cross-sectional configuration, the slotted configuration in each pinion 236 includes four equally spaced recesses 286 joined to each other and equally disposed about axis 212 of operating shaft assembly 210. Each recess 286 includes first, second, and third walls or surfaces 287, 288 and 289, respectively. The wall or surface 288 of each recess 286 in the slip socket 284 of pinions 236 has a curvilinear configuration and a radius equal to one-half the distance between diametrically opposed corners of shaft 220. The angular offset between the walls or surfaces 287 and 289 of each recess 286 in the slip socket 284 defined by pinions 236 limits the free rotational movement of the operating shaft assembly 210 about axis 212. As will be appreciated, if the cross-sectional configuration of shaft 220 were other than square, the configuration of the slip socket 284 defined by the pinions 236 may likewise be altered to accommodate a predetermined angle of free rotation of the operating shaft assembly 210.

As will be appreciated, timed unlatching or removal of the lock assembly stop 262 from the path of movement of the gate 70 is critical to proper performance of gate assembly 30. Of course, and since the AAR Standards require unlatching of the gate 70 to relate to operation shaft assembly 210, inadvertent skipping movements of the pinions 236 relative to the racks 234 will destroy such timed relationship. It is not unusual, however, for the pinions 236 to skip relative to the racks 234, thus, hindering timing of operation between the gate 70 and lock mechanism 260 in response to high torque levels being inputted to the shaft assembly 210. Such high torque levels typically result during the initial opening stages for gate 70. Such high levels of torque tend to cause the shaft 220 of assembly 210 to deflect relative to its rotational axis 212 thereby resulting in displacement of the pinions 236 relative to the racks 234, thus, destroying timed movement of the gate 70 with operation of the operating shaft assembly 210.

Figure 19:
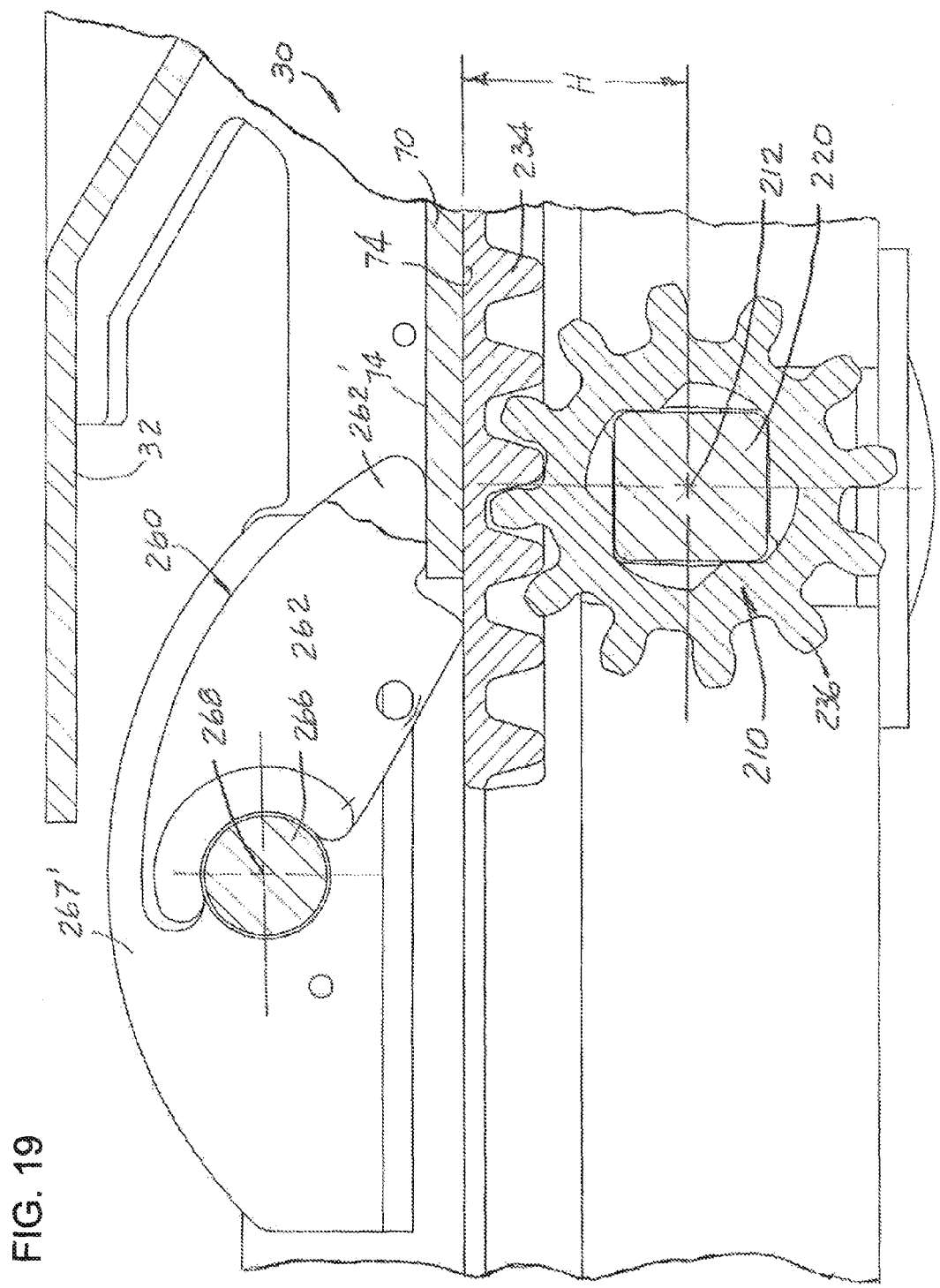
FIG. 19 is an enlarged fragmentary side sectional view similar to FIG. 13.

In the embodiment illustrated in FIG. 19, the dimension H between the bottom or lower surface 74 of the gate 70 and the rotational axis 212 of the operating shaft assembly 210 is critical to the overall functionality of the gate assembly 30 because the racks 234 of the drive mechanism 230 are mounted to the lower surface 74 of the gate 70 and because the drive pinions 236 are mounted to the operating shaft 210. If the drive pinions 236 are too close to the racks 234 as a result of displacement of the operating shaft 220 relative to axis 212, drive mechanism 230 will tend to bind. If the drive pinions 236 move too far away from the racks 234 as a result of displacement of the operating shaft 220 relative to axis 212, there is an opportunity for the teeth on the pinions 236 to slip relative to the teeth on the racks 234 whereby causing the drive mechanism 230 to "skip." When "skipping" occurs, the operating shaft 220 can rotate without corresponding linear displacement of the gate 70. As a result, adverse timing of the lock assembly 260 can occur.

Returning to FIGS. 4 and 4A, the vertical location of the lower surface 74 of gate 70 is determined by the location of the upper surface 99 of the supports 92, 94 and 96. In order to maintain the dimension H (FIG. 19) at the correct measurement relative to the rotational axis 212 of operating shaft 220 whereby insuring proper operation of drive mechanism 220, structure 290 (FIG. 12) is preferably provided in operable combination with the gate assembly frame 32 for guiding and supporting the operating shaft 220 of assembly 210. As will be appreciated by those skilled in the art, the structure 290 for guiding, supporting and inhibiting bending of the operating shaft 220 of assembly 210 relative to axis 212 can take any of a myriad of configurations without detracting or departing from the spirit and scope of this invention disclosure.

In the form shown in FIGS. 3 and 12, structure 290 includes a series of supports 292, 292' and 292" longitudinally extending below the lower surface 74 of gate 70 and beyond the lower portion 39l of the end frame member 39 of the gate assembly frame 32. Preferably, and as shown in FIG. 6, each support 292, 292' and 292" extends from the depending wall 66d on the lower portion 39l of the second end frame member 39 of gate assembly frame 32. A suitable weldment (not shown) secures and fixes each support member 292, 292' and 292" to the depending wall 66d on the lower portion 39l of the second end frame member 39.

Each support 292, 292' and 292" is preferably structured to guide and support the operating shaft 220 of assembly 210. In one form the structure used to guide and support shaft 220 of assembly 210 includes a closed marginal opening 294 defined by each support 292, 292' and 292" and arranged in surrounding relation relative to shaft 220 of assembly 210. The bore or opening 294 is located relative to axis 212 and sized relative to the cross-section of the shaft 220 of assembly 210. As such, the closed margin defined by each bore 294 ensures true or axial rotation of the shaft 220 relative to axis 212 while restricting deflection of shaft 220 relative to axis 212.

Alternatively, and without detracting or departing from the spirit and scope of this invention disclosure, each support 92, 94 and 96 of support structure 90 could be longitudinally extended past the depending wall 66d on the lower portion 39l of the second end frame member 39 and defines a hole or opening similar to opening 294 described above to ensure true or axial rotation of the shaft 220 relative to axis 212 while restricting deflection of shaft 220 relative to axis 212. Suffice it to say, structure 290 in whatever form desired, advantageously supports and guides the shaft 220 of assembly 210 to limit deflection of the shaft 220 relative to axis 212 so as to facilitate and maintain dimension H (FIG. 19) generally constant and thereby maintaining the pinions 236 mounted on and along shaft 220 in proper intermeshing and operable engagement with the racks 234 on gate 70 regardless of the torque level inputted to operating shaft assembly 130 whereby guarding against "binding" and "skipping" of the drive mechanism 210.

Figure 20:
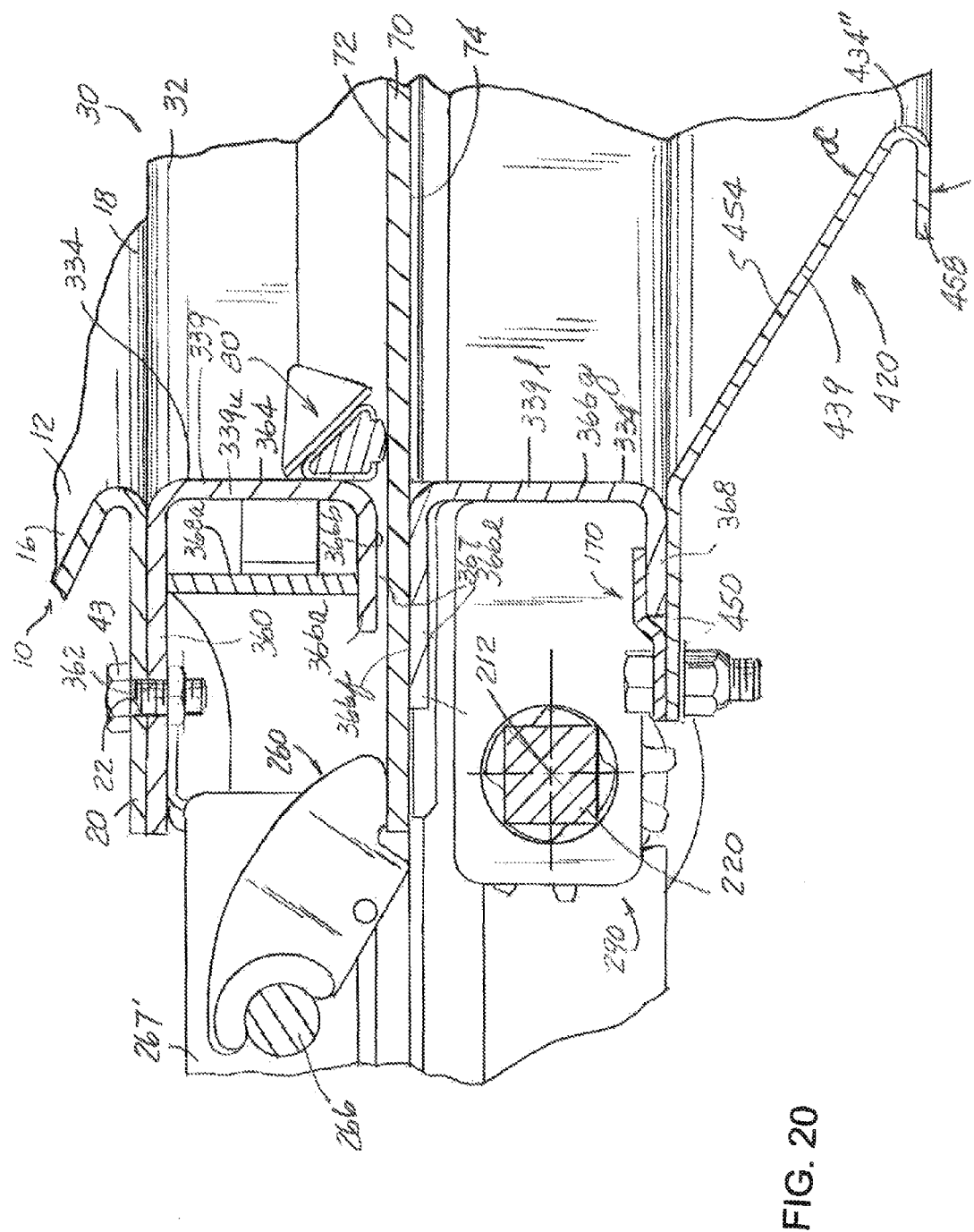
FIG. 20 is a fragmentary side view similar to FIG. 6 but showing alternative embodiments for the gate assembly frame and adapter.

As mentioned above, the adapter for influencing the flow of commodity from the discharge gate assembly 30 can take different shapes and configurations without detracting or departing from the true spirit and novel scope of this invention disclosure. FIG. 20 illustrates an alternative embodiment for the rear or second end frame member of the gate assembly frame and an alternative embodiment for the rear end member of the adapter releasably secured to the gate assembly frame for influencing commodity flowing or passing from the gate assembly 30. The alternative form of the rear or second end frame member of the gate assembly is designated generally in FIG. 20 by reference numeral 339. The alternative form of the rear end member of the adapter is generally designated by reference numeral 439. The other elements of this alternative form of end frame member that are identical or functionally analogous to the elements discussed above regarding end frame member 39 are designed by reference numerals identical to those used above with the exception this embodiment illustrated by way of example in FIG. 20 uses reference numerals in the 300 series. Similarly, the other elements of the alternative form of rear end member for the adapter that are identical or functionally analogous to the elements discussed above regarding end member 139 of adapter 120 are designed by reference numerals identical to those used above with the exception the embodiment illustrated by way of example in FIG. 20 uses reference numerals in the 400 series In the embodiment illustrated in FIG. 20, the second or rear end frame member 339 of gate assembly 30 includes an upper portion 339u and a lower portion 339l which, in the embodiment illustrated by way of example in FIG. 20, are rigidly connected to the side frame members of the gate assembly 30 but are separate from each other. As shown in FIG. 20, the upper portion 339u of the end frame member 339 includes an outwardly extending, rigid and generally planar mounting flange 360 arranged above an upper surface 72 of the gate 70 and defining a series of side-by-side openings or holes 362 to allow a shank portion of a threaded fastener 43 to extend therethrough. In the illustrated embodiment, fastener 43 includes and cooperates with a threaded nut whereby facilitating securement of gate assembly 30 to the conventional mounting flange 20 on the bottom of the railcar hopper 12. Notably, the mounting flange 360 of the upper portion 339u on the second end frame member 339 is arranged generally coplanar with the mounting flanges on the side frame members and the mounting flange on the other end member of the gate assembly frame.

In the alternative embodiment illustrated by way of example in FIG. 20, the upper portion 339u of the second end frame member 339 further includes a depending wall 364 extending generally perpendicular relative to the upper mounting flange 360 whereby significantly increasing the cross-sectional size or area of the discharge opening 334 defined by the gate assembly 30 above the upper surface 72 of gate 70 as compared to the cross-sectional size or area of the discharge opening 34. In the illustrated embodiment, of rear end frame member 339, the depending wall 364 is rigidly joined to the mounting flange 360 above an upper surface 72 of the gate 70. In the embodiment shown in FIG. 20, wall 364 of the upper portion 339u of the end frame member 339 depends from where it is joined to the mounting flange 360 and terminates in a generally horizontal wall section 366a having a surface 366b disposed above an upper surface 72 of gate 70. Preferably, the depending wall 364 on the end frame member 339 is formed integral with the mounting flange 360 and the generally horizontal wall section 366a.

Preferably, the upper portion 339u of the end frame member 339 furthermore includes a stiffening member 368a for adding strength and rigidity thereto. In one form, the stiffening member 368 transversely extends between the side frame members of the gate frame 32 above the gate 70 and below the upper mounting flange 360 of the end frame member 339. In the illustrated embodiment, the stiffening member 368a extends vertically between a lower surface of the mounting flange 360 and an upper surface of the generally horizontal wall section 366a opposite surface 366b. In one form, the stiffening member 368a is fastened as by welding and the like to an underside of the upper mounting flange 360 and generally horizontal wall section 366a.

In the illustrated embodiment, the lower portion 339l of the second end wall 339 of gate assembly 30 includes a generally horizontal wall 366e defining a generally horizontal surface 366f supporting the lower surface 74 of gate 70 and which spans the distance between the opposed side frame members of frame 32. As shown, surface 366f is vertically spaced from surface 366a of the upper portion 339u of the end wall 339 so as to define an opening or slot 367 therebetween. The opening or slot 367 extends transversely across the width of the end member 339 whereby permitting gate 70 to slidably move therethrough in a single generally horizontal path of travel between closed and open positions.

In the embodiment illustrated by way of example in FIG. 20, the lower portion 339l of the second end wall 339 of gate assembly 30 further includes a generally vertical wall 366g extending downwardly from a terminal end of the generally horizontal wall 366e. As will be appreciated by those skilled in the art, the generally vertical design of wall 366g significantly increasing the cross-sectional size or area of the discharge opening 334' defined by the gate assembly 30 below and in material receiving relation with opening 334 as compared to the cross-sectional size or area of the discharge opening 34' discussed above. Preferably, the generally vertical wall 366g and the generally horizontal wall 366e of the lower portion 339l of frame 32 are rigidly joined to each other. Furthermore, in the embodiment illustrated by way of example in FIG. 20, the generally vertical wall 366g of the lower portion 339l of the second end wall 339 and the depending wall 364 on the upper portion 339u of the second end wall 339 are disposed in generally the same vertical plane relative to each other.

As shown by way of example in FIG. 20, the generally vertical wall 366g on the lower portion 339l of the end frame member 339 terminates at a location where it is joined to a boot flange 368. As shown, the boot flange 368 on the lower portion 339l of the end frame member 339 is spaced from but extends in the same direction and in generally parallel relation with the generally horizontal wall 366e of end member 339. Preferably, wall 366e, wall 366g, and the boot flange 368 are integrally formed with each other. Moreover, in a preferred embodiment, the boot flanges on the side frame members of the gate assembly along with the boot flange on the other end frame member together with the boot flange 368 on the lower portion 339l of the end frame member 339 are all arranged in parallel and generally coplanar relation relative to each other.

With the exception of an alternative form for a rear or end member 439, structure 420 shown in FIG. 20 is substantially similar to structure 120 discussed above. In the embodiment shown by way of example in FIG. 20, and when adapter 420 is operably coupled to the gate assembly 30, the end member 439 of structure 420 is disposed in operable combination with the end frame member 339 of frame assembly 32. In the embodiment shown by way of example in FIG. 20, end member 339 of adapter 420 includes an upper outwardly extending, rigid and generally planar mounting flange 450. Suffice it to say, the upper mounting flange 450 of the end member 439 is arranged generally coplanar with the mounting flanges on the other frame members of structure 420.

As illustrated in FIG. 20, end member 439 of adapter 420 further includes a horizontally slanted generally planar wall or baffle 454 extending downwardly and away from the respective upper mounting flange 450 of end member 439 and inwardly toward the center of the gate assembly 30. In a preferred embodiment, the slanted wall or baffle 454 on the end member 439 of adapter 420 angles downwardly and inwardly toward the center of the gate assembly 30 and at acute angle α which is generally equal to the acute angle α defined between the slanted wall or baffle and the mounting flanges on the side members of adapter 420. As will be appreciated by those skilled in the art, and especially when compared with the adapter 120 illustrated in FIG. 6, the provision of the slanted wall or baffle 454 longitudinally shifts the location of the discharge outlet or opening 434" as compared to the discharge opening 34" defined by adapter 120. Of course, the angle of the slanted wall or baffle 45 on adapter 420 will ultimately determine the longitudinal location or disposition of the discharge opening 34" defined by adapter 420. As such, differences in the location of the unloading boots at different unloading sites can be easily and readily compensated for by selecting the particular modular adapters having the designated spacings between lower discharge openings on adjacent adapters.

The horizontally slanted wall or baffle 454 on the end member 439 of adapter 420 terminates at a location where it is joined to a boot flange 458. The boot flange 458 on the end member 439 of adapter 420 is spaced from but extends in the same direction and in generally parallel relation with the respective mounting flange 450. Preferably, the mounting flange 450, the slanted wall or baffle 454 and the boot flange 458 are integrally formed with each other. To facilitate having a discharge boot (not shown) abutted thereto when commodity is to be discharged from the hopper 12 (FIG. 1) through gate assembly, the boot flange 458 on the end member 439 of structure 420 is preferably arranged in generally coplanar relation relative to the boot flanges on the other members of adapter 420.

Suffice it to say, this alternative form of adapter 420 can be releasably affixed to and carried by at least two of the flanges defined by any two opposed end frame members on the gate assembly using the same or equivalent structure to that discussed above in connection with FIGS. 9 through 11 and/or other suitable alternative means.

Operation of the gate 70 and lock assembly 260 is such that when gate 70 is in a closed position (FIG. 13), each stop 262, 262' of lock assembly 260 is in positive engagement with gate 70 and shaft 220 of the operating shaft assembly 210 is disposed relative to the slip pinions 236 substantially as shown in FIG. 13. As such, gate 70 is inhibited from moving toward an open position at this time. With the gate 70 closed, the outer surfaces of shaft 220 extends generally parallel to and likely engages the walls or surfaces 287 (FIG. 18) of each slip socket or recess 286 of each slip pinion 236.

As discussed above, in the closed position, gate 70 is preferably supported within the discharge opening 34 by the structure 90 (FIGS. 2, 4 and 4A) extending across the discharge opening 34 beneath the gate 70. Moreover, seal structure 80 surrounds the periphery of the gate 70 to inhibit contaminants, moisture, and insect infiltration from passing between the gate assembly 32 and the door or gate 70. Preferably, seal structure 80 inhibits commodity from inadvertently leaking from the gate assembly 30 when the gate 70 is in the closed position.

In the preferred embodiment shown in FIG. 2, the supports 94 and 96 are preferably disposed adjacent the side frame members 36, 37 of gate assembly frame 32 in a manner maximizing the effectiveness of the seal structure 80 about the peripheral edge of the gate 70 and, thus, reducing leakage of commodity therepast. The preferred arrangement of the supports 94 and 96 adjacent to the side frame members 36, 37 on the gate assembly frame 32 furthermore maximizes the clearance for and reduces obstructions to commodity passing from hopper 12 (FIG. 1). Providing a UHMW-type material 98 between the support structure 90 and the underside 74 of the gate 70 (FIGS. 4 and 4A) furthermore reduces the coefficient of friction therebetween whereby lessening the torque requirements required to be inputted to assembly 210 to move gate 70 toward the open position.

When gate 70 is to be opened, a suitable tool or powered driver (not shown) operably engages with and is operated to turn or rotate the operating shaft assembly 210 in the appropriate direction. In the embodiment illustrated in FIG. 21, shaft assembly 210 is turned in a counterclockwise direction to open the gate 70. As will be appreciated, rotation of shaft assembly 210 causes rotation of shaft 220. As shown, turning shaft assembly 210 likewise causes rotation of the cam structure 272 while also resulting in breakage of the tamper seal 280 (FIG. 17).

Figure 21:
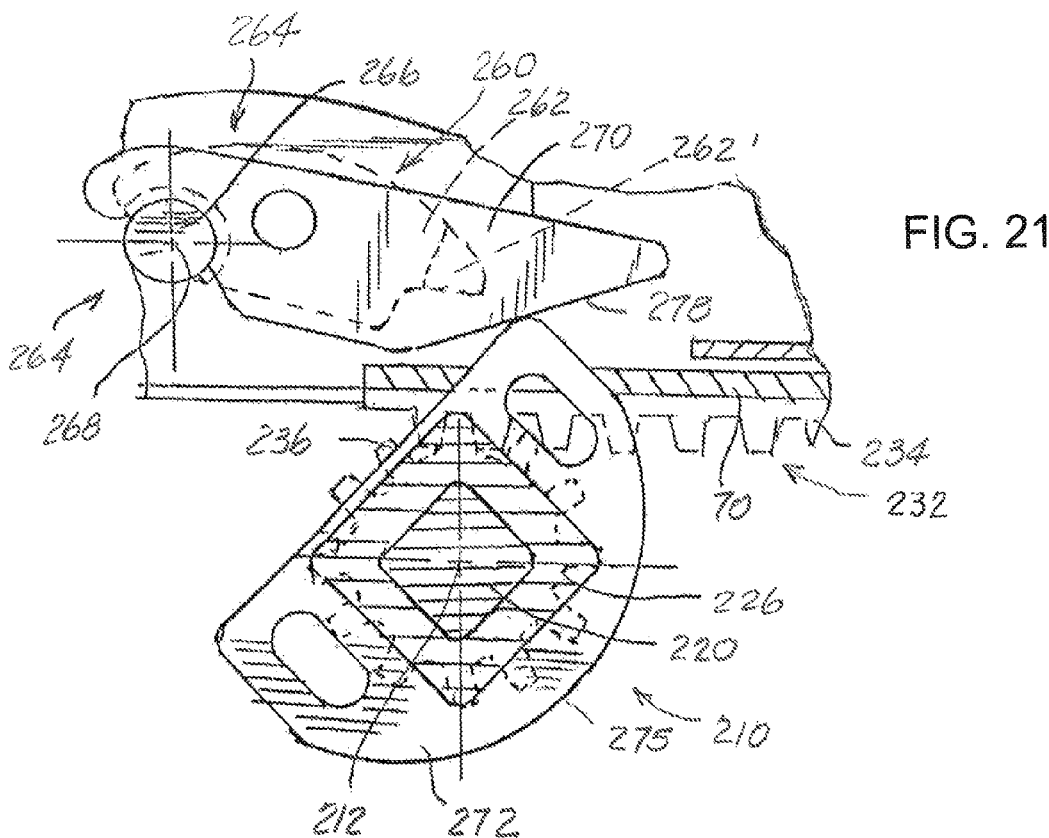
FIG. 21 is a schematic showing of the components of the gate assembly as the operating shaft assembly is rotated to move the gate toward an open position.

During initial rotation of shaft assembly 210, the cam structure 272 actuates the mechanical system 264 of lock assembly 260. That is, initial rotational movement of the shaft assembly 210 forcibly and positively displaces the cam follower 270 against the action of spring 269 (FIG. 16) resulting in counterclockwise rotation of the rockshaft 266 as shown in FIG. 21. Counterclockwise rotation of rockshaft 266 effects displacement and removal of the stops 262, 262' from the predetermined path of travel of gate 70.

During initial rotational movement of the operating shaft assembly 210 in a direction to move the gate 70 toward an open position, shaft 220 traverses the radial space between surfaces 287 and 289 in the slotted recesses 286 of each slip pinion 236 and no linear movement is imparted to the gate or door 70. That is, during initial rotational movement of the operating shaft assembly 210 in a direction to move the gate 70 toward an open position, the operating shaft assembly 210 turns through a range of free angular movement ranging between about 35° to about 55° without any corresponding linear movement of the gate 70 toward an open position. In a most preferred form, the shaft assembly 210 turns through a range of free angular movement of about 45°. It is through this range of free angular movement of the operating shaft assembly 210, wherein there is no displacement of gate 70 toward the open position, that the mechanical system 264 unlatches/unlocks the lock assembly 260 from operable engagement with gate 70.

Figure 22:
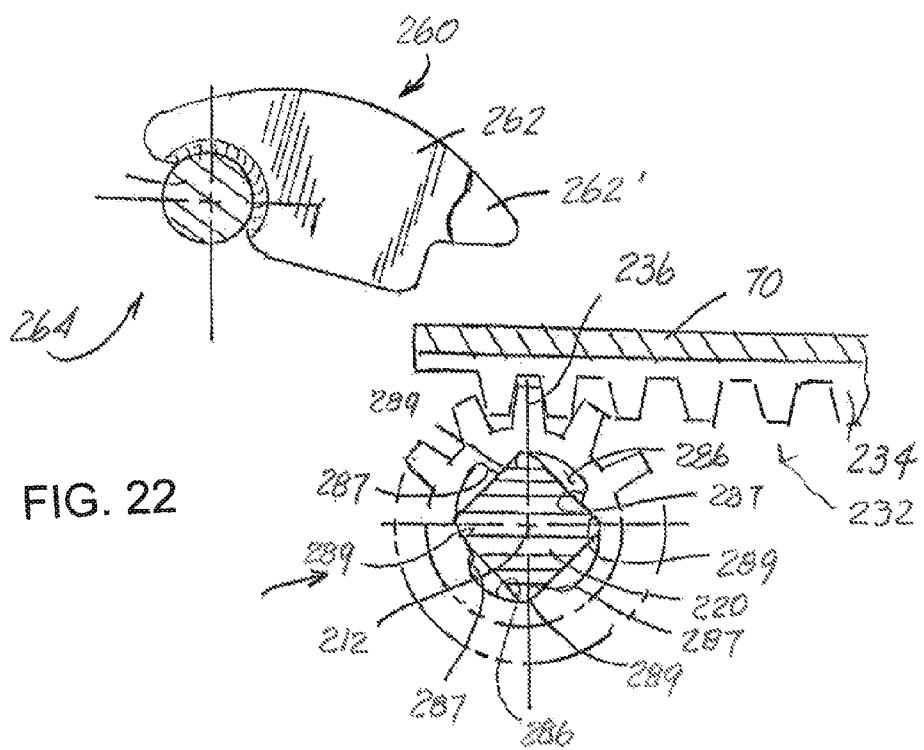
FIG. 22 is a fragmentary sectional side view showing the relationship of various component parts of the present invention when the operating shaft assembly is rotated to the position shown in FIG. 21.

At the limit of free rotational movement of operating shaft assembly 210, shaft 220 is disposed as shown in FIG. 22 within the slip socket 286 of each pinion 236 of drive mechanism 230. In such position, the outer surfaces on shaft 220 extend generally parallel with and likely engage the third wall or surface 289 of each slip socket 284 of each pinion 236.

Figure 23:
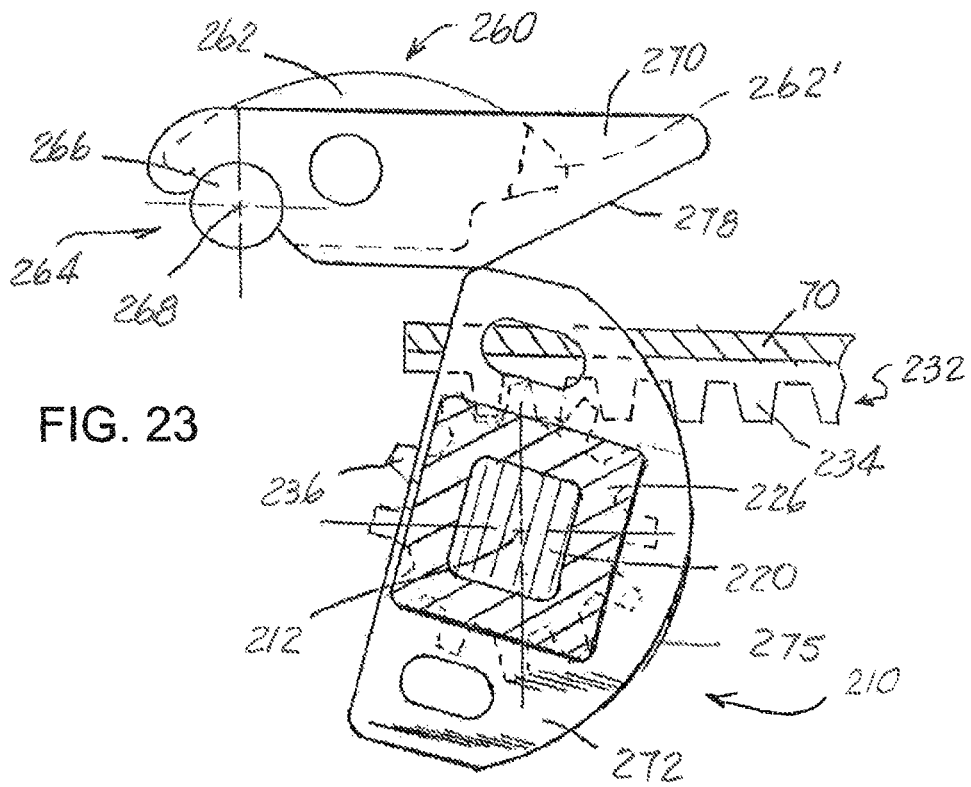
FIG. 23 is a fragmentary sectional side view similar to FIG. 22 but showing further rotation of the operating shaft assembly to move the gate toward the open position.
Figure 24:
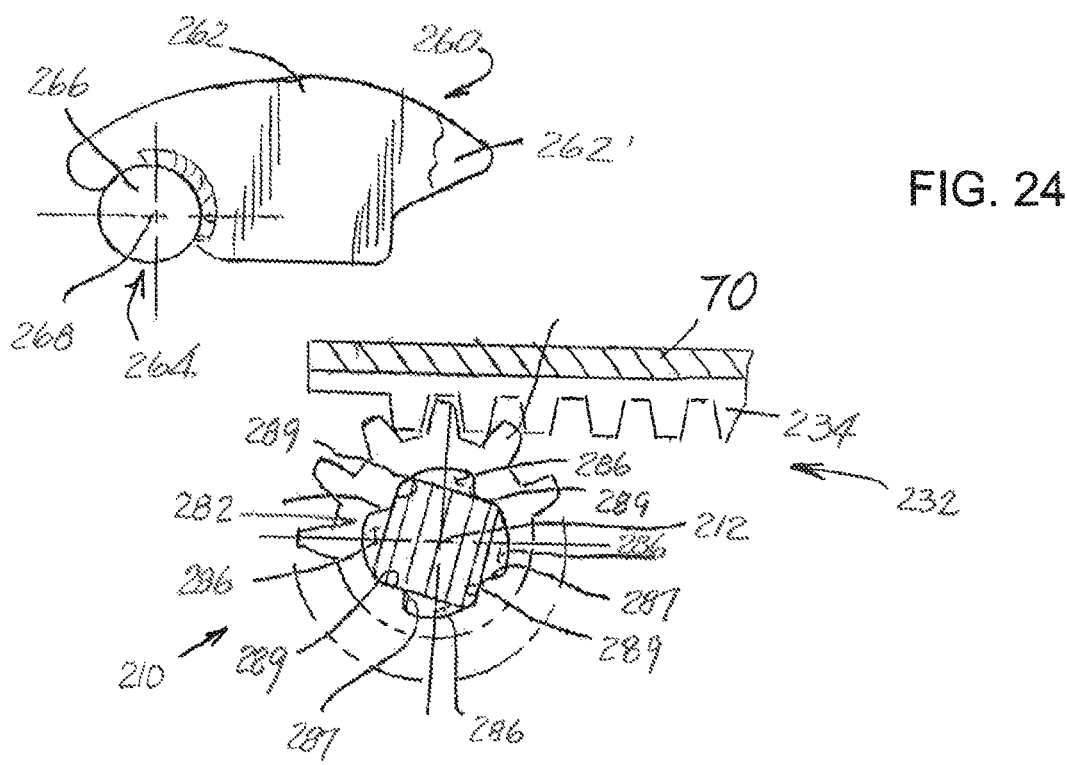
FIG. 24 is a fragmentary sectional side view showing the relationship of various component parts of the present invention when the operating shaft assembly is rotated to the position shown in FIG. 23.

Continued rotation of operating shaft assembly 210 in a direction to the position schematically illustrated in FIG. 23 causes the gate 70 to move toward the open position and causes the cam structure 272 to further displace or move the stops 262, 262' from the path of movement of the gate 70 against the action of spring 269 (FIG. 16) while concomitantly resulting in rotation of the pinions 236 and linear displacement of the gate 70 toward an open position. That is, and as shown in FIG. 24, upon the collapse of the lost motion mechanism 282, provided by the shaft 220 traversing the distance separating radial surfaces 287 and 289 of the slip pinions 236, the pinions 236 are thereafter operably coupled to the shaft 220 resulting in linear displacement of the gate 70 toward the open position. After the lock assembly 260 is unlatched or released from the operable engagement with gate 70, the cam structure 272 is configured such that the stops 262, 262' are positioned above or ride along an upper surface 723 of the gate 70 so as to remain out of engagement with the gate 70 until gate 70 is returned to the closed position.

With gate 70 now moved to an open position, commodity within the hopper 12 (FIG. 1) can be discharged therefrom. Notably, and with gate 70 moved to an open position (FIG. 15), the seal structure 250 inhibits inadvertent leakage of commodity through the openings 237 in the frame 32. Suffice it to say, the gate assembly 30 is advantageously configured and design to positively limit the tolerance locations to which the gate 70 can be moved toward a final open position.

In the embodiment illustrated by way of example, the plurality of walls on the adapter 120 disposed below the discharge opening 34' of the gate assembly 30 combine to influence the flow of commodity from the gate assembly 30. In the embodiment illustrated by way of example, the size of the discharge opening 34" defined by the adapter 120 is smaller than the discharge opening defined by the gate assembly 30. As such, the flow of commodity from the discharge gate assembly 30 can be restricted or throttled while maintaining a standard size opening the gate assembly 30. Moreover, the ability to easily and readily change the standardized size opening on the discharge gate assembly 30 reduces the likelihood of the commodity spilling or otherwise being lost during the commodity unloading process. It should be appreciated, however, it is well within the scope of this invention disclosure that the discharge opening 34' defined by the lower portion of the gate assembly 30 disposed below the lower surface 74 of the gate 70 can define a discharge opening having an area measuring equal to if not greater than the area of the discharge opening 34 defined by the upper portion of the discharge gate assembly disposed at the upper surface 72 of the gate 70 without detracting or departing from the novel spirit and broad scope of this invention disclosure.

With this invention disclosure, the adapter 120 can furthermore be utilized to longitudinally position the relative location or disposition of the discharge opening 34" relative to the standard chute opening 18 on hopper car 10 (FIG. 4). That is, and depending upon the angle and the number of slanted surfaces provided on the adapter 120, the location or disposition of the discharge opening 34" relative to the standard chute opening 18 on hopper car 10 (FIG. 4) can be changed or modified. As such, the flow of commodity from the discharge gate assembly 30 can be influenced to more closely align with the disposition of the unloading boot location to minimize the loss of commodity being discharged through the adapter 120. Of course, the ability to readily remove the adapter 120 from the gate assembly 30 allows the car 10 to be returned to its original service with minimal equipment and operator involvement in time and expense.

After the commodity is discharged from car 10, the operating shaft assembly 210 is rotated to close the gate 70. When the operating shaft assembly 210 is rotated to close the gate 70, the shaft 220 initially traverses the angular or radial distance separating walls or surfaces 287 and 289 within the slotted recesses 286 on the pinions 236 until the outer surface of shaft 220 engages with walls or surface 287 within the slotted recesses 286 on the pinions 236. Continued rotation of the operating shaft assembly 210 imparts rotation to the pinions 236 which is transmuted to linear displacement of the gate 70 toward the closed position by the rack and pinion assembly 232. When the gate 70 reaches the closed position, the cam structure 272 returns substantially to the position shown in FIG. 17. Accordingly, the effects of gravity and the influence of the spring 269 (FIGS. 12 and 16) urge the stop 262, 262' of lock assembly 260 into the position shown in FIG. 13 whereby again releasably locking the gate 70 in the closed position or condition.

From the foregoing, it will be observed that numerous modifications and variations can be made and effected without departing or detracting from the true spirit and novel concept of the present invention. Moreover, it will be appreciated, the present disclosure is intended to set forth exemplifications of the invention disclosure which are not intended to limit the invention to the specific embodiments illustrated. Rather, this disclosure is intended to cover by the appended claims all such modifications and variations as fall within the spirit and scope of the claims.

What is claimed is:

1. A method for influencing gravitational discharge of material from a railroad hopper car, comprising the steps:
   providing a discharge gate assembly in material receiving relation relative to an discharge outlet defined by said hopper car, said discharge gate assembly having a rigid frame including a pair of laterally spaced, opposed and generally parallel side frame members and a pair of longitudinally spaced, opposed and generally parallel end frame members secured in a generally rectangular configuration relative to each other, with said side frame members and end frame member combining with each other to define a discharge opening through which commodity is adapted to gravitationally pass from a chute opening on said hopper car, with said gate assembly further including a gate supported on said frame for linear sliding movement along a single predetermined and generally horizontal path of travel between closed and open positions to selectively control discharge of commodity from the railroad car, and wherein said side frame members and end frame members each include an upper outwardly extending mounting flange for facilitating connecting said gate assembly to said hopper car, with the upper mounting flanges on said side frame members and end frame members being arranged above an upper surface of the gate and in generally coplanar relation relative to each other, and with said side frame members and end frame members each including a depending wall extending generally perpendicular to the upper flange and below a lower surface of the gate, and with each side frame member and each side frame further having a boot flange extending generally parallel to the upper mounting flange, with the boot flanges on said frame members being arranged below the lower surface of the gate and in generally coplanar relation relative to each other; and
   releasably suspending an adapter beneath the discharge opening defined by said frame members to influence commodity being discharged from the discharge opening defined by said frame members, with said adapter including at least one horizontally slanted surface extending inwardly relative to the discharge opening defined by the frame members of said gate assembly, and with said adapter further including a lower boot flange for allowing a discharge boot to be abutted thereto.

2. The method for influencing gravitational discharge of material from a railroad hopper car according to claim 1, wherein the step releasably suspending said adapter beneath said discharge opening defined by said frame members further involves sliding said adapter onto the boot flanges of at least two opposed frame members; and releasably securing said adapter to said gate assembly frame.

3. The method for influencing gravitational discharge of material from a railroad hopper car according to claim 1, wherein the step releasably suspending said adapter beneath said discharge opening defined by said frame members involves clamping said adapter to gate assembly frame.

4. The method for influencing gravitational discharge of material from a railroad hopper car according to claim 1, wherein the step releasably suspending said adapter beneath said discharge opening defined by said frame members further involves welding said portions of said adapter of gate assembly frame.

5. The method for influencing gravitational discharge of material from a railroad hopper car according to claim 1, wherein the step releasably suspending said adapter beneath said discharge opening defined by said frame members involves supporting said adapter on brackets disposed between said adapter and the gate assembly frame.

6. The method for influencing gravitational discharge of material from a railroad hopper car according to claim 1, wherein said adapter includes two horizontally slanted surfaces arranged in depending relation relative to an upper surface of said adapter and extending inwardly from a marginal edge of at least two sides of the discharge opening defined by said frame members.

7. A method for influencing gravitational discharge of material from a railroad hopper car, comprising the steps of:
   providing a discharge gate assembly in material receiving relation relative to a chute opening defined by said hopper car, said discharge gate assembly defining a discharge opening and has a gate supported for linear sliding movement between closed and open positions to selectively control discharge of material through said discharge opening and from the railroad car, with a first portion of said gate assembly being disposed above an upper surface of said gate and a second portion of said gate assembly being disposed below a lower surface of said gate and including a generally horizontal boot flange; and
   suspending an adapter in releasably fixed relation relative to the generally horizontal boot flange on the second portion of said gate assembly to influence material being discharged through said discharge opening, with said adapter including at least one horizontally slanted surface extending inwardly relative to the discharge opening defined by said gate assembly.

8. The method for influencing gravitational discharge of material from a railroad hopper car according to claim 7, wherein the step suspending said adapter in releasably fixed relation relative to the second portion of said gate assembly further involves sliding said adapter onto a boot flanges defined by at least two opposed frame members of said gate assembly and releasably securing said adapter to a frame of said gate assembly.

9. The method for influencing gravitational discharge of material from a railroad hopper car according to claim 7, wherein the step of suspending said adapter in releasably fixed relation relative to the second portion of said gate assembly further involves clamping said adapter to a frame of said gate assembly.

10. The method for influencing gravitational discharge of material from a railroad hopper car according to claim 7, wherein the step suspending said adapter in releasably fixed relation relative to the second portion of said gate assembly further involves welding portions of said adapter to a frame of said gate assembly.

11. The method for influencing gravitational discharge of material from a railroad hopper car according to claim 7, wherein the step suspending said adapter in releasably fixed relation relative to the second portion of said gate assembly further involves supporting said adapter on brackets disposed between said adapter and a frame of the gate assembly.

12. The method for influencing gravitational discharge of material from a railroad hopper car according to claim 7, wherein said adapter includes two horizontally slanted surfaces arranged in depending relation relative to an upper surface of said adapter and extending inwardly from a marginal edge of at least two sides of the discharge opening defined by said gate assembly.

\* \* \* \* \*